United States Patent
Shi et al.

(10) Patent No.: US 12,510,371 B2
(45) Date of Patent: Dec. 30, 2025

(54) GEOGRAPHIC INFORMATION PROCESSING METHOD AND APPARATUS

(71) Applicant: SHENZHEN YINWANG INTELLIGENT TECHNOLOGIES CO., LTD., Shenzhen (CN)

(72) Inventors: Zijuan Shi, Shanghai (CN); Sen Lv, Dongguan (CN); Qiuyuan Tang, Shanghai (CN); Guodong Zhang, Shanghai (CN); Huazhou Yu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 258 days.

(21) Appl. No.: 18/486,843

(22) Filed: Oct. 13, 2023

(65) Prior Publication Data

US 2024/0035838 A1 Feb. 1, 2024

Related U.S. Application Data

(63) Continuation of application No. PCT/CN2022/087237, filed on Apr. 15, 2022.

(30) Foreign Application Priority Data

Apr. 16, 2021 (WO) ................ PCT/CN2021/087770

(51) Int. Cl.
*G01C 21/36* (2006.01)
*H04W 4/80* (2018.01)

(52) U.S. Cl.
CPC .......... *G01C 21/3632* (2013.01); *H04W 4/80* (2018.02)

(58) Field of Classification Search
USPC ........................................... 709/219
See application file for complete search history.

(56) References Cited

U.S. PATENT DOCUMENTS

| | | | |
|---|---|---|---|
| 6,633,809 B1 | 10/2003 | Aizono et al. | |
| 10,111,025 B2 * | 10/2018 | Kang | H04W 12/08 |

(Continued)

FOREIGN PATENT DOCUMENTS

| | | |
|---|---|---|
| CN | 1796943 A | 7/2006 |
| CN | 103487060 A | 1/2014 |

(Continued)

OTHER PUBLICATIONS

Office Action in Japanese Appln. No. 2023-563240, mailed on Nov. 5, 2024, 17 pages (with English translation).

(Continued)

*Primary Examiner* — Quang N Nguyen
(74) *Attorney, Agent, or Firm* — Fish & Richardson P.C.

(57) ABSTRACT

This application discloses a geographic information processing method, which may be applied to a terminal like a head unit, an in-vehicle PC, a mobile phone, or a smart band, and may be applied to a scenario in an intelligent vehicle. The method includes: A first device displays first location information on a corresponding first plane, and then the first device sends a first message to a second device. The first message indicates the second device to output location information related to the first location information. After receiving the first message, the second device may output, based on the first message, second location information related to the first location information. This helps simplify a user operation.

18 Claims, 20 Drawing Sheets

(56) References Cited

U.S. PATENT DOCUMENTS

| | | |
|---|---|---|
| 10,117,129 B2 * | 10/2018 | Jung .................. H04W 4/80 |
| 10,149,278 B2 * | 12/2018 | Borges ................ H04W 48/16 |
| 12,238,524 B2 * | 2/2025 | Keum .................. H04W 4/50 |
| 2010/0071763 A1 | 3/2010 | Park |
| 2016/0138931 A1 | 5/2016 | Kang |
| 2018/0131737 A1 | 5/2018 | Jamal-Syed et al. |
| 2018/0139318 A1 | 5/2018 | Choi |
| 2020/0249024 A1 | 8/2020 | Lee |

FOREIGN PATENT DOCUMENTS

| | | |
|---|---|---|
| CN | 103488670 A | 1/2014 |
| CN | 109495845 A | 3/2019 |
| WO | 2014174893 A1 | 10/2014 |
| WO | 2018144026 A1 | 8/2018 |

OTHER PUBLICATIONS

International Search Report and Written Opinion in International Appln. No. PCT/CN2021/087770, mailed on Jan. 13, 2022, 20 pages (with English translation).

International Search Report and Written Opinion in International Appln. No. PCT/CN2022/087237, mailed on Jul. 1, 2022, 17 pages (with English translation).

Extended European Search Report in European Appln No. 22787655.4, dated Dec. 18, 2023, 8 pages.

* cited by examiner

Introduction to Park A

Opening hours: 06:00 to 18:00

It's the largest park in City B,...

...

Address:  — 61

GEOGRAPHIC INFORMATION PROCESSING METHOD AND APPARATUS

CROSS-REFERENCE TO RELATED APPLICATIONS

This application is a continuation of International Application No. PCT/CN2022/087237, filed on Apr. 15, 2022, which claims priority to International Patent Application No. PCT/CN2021/087770, filed on Apr. 16, 2021. The disclosures of the aforementioned applications are hereby incorporated by reference in their entireties.

TECHNICAL FIELD

This application relates to the field of information processing, and in particular, to a geographic information processing method and apparatus.

BACKGROUND

As people's economic level improves, a user usually has at least two smart devices. Consider a following common scenario: When a driver drives a vehicle, a mobile phone of the driver receives information about a meeting place sent by a friend, for example, information content is "See you at Gate N of Park A". After reading the information content, if the driver wants to use a head unit of the vehicle to navigate to Gate N of Park A, the driver needs to first accurately memorize the content "Gate N of Park A" that describes the place, then manually enter the content into a navigation interface of the head unit, and operate the head unit to navigate to Gate N of Park A. This is complex and even increases a driving accident risk.

SUMMARY

Embodiments of the present invention provide a geographic information processing method and apparatus, to simplify an operation of enabling a second intelligent device to output location information related to first location information displayed by a first intelligent device.

A first aspect of embodiments of the present invention provides a geographic information processing method, where the method includes: A first device displays first location information on a corresponding first plane; then the first device sends a first message to a second device, where the first message indicates the second device to output location information related to the first location information; and after receiving the first message, the second device may output, based on the first message, second location information related to the first location information.

It can be learned that, after displaying the first location information, the first device sends the first message to the second device, which helps implement that the second device can output the location information related to the first location information without a need for a user to manually enter the location information related to the first location information to the second device, thereby simplifying a user operation.

In a possible implementation, that the second device outputs the second location information may be that the second device displays the second location information on a corresponding second screen, or plays the second location information in audio.

In a possible implementation, establishment information indicates the first device to establish a first communication connection.

In a possible implementation, in addition to displaying the first location information on a first screen by the first device, a trigger event of sending the first message to the second device by the first device further includes: The first device obtains the establishment information of the first communication connection.

The first device includes the obtained establishment information in the trigger event of sending the first message, which helps the first device more accurately predict whether the user expects the second device to output the location information related to the first location information, thereby helping save device resources (for example, computing resources and network resources) of the first device and the second device.

In a possible implementation, the first device may send the first message to the second device based on that the first device displays the first location information on the first screen and receives the establishment information after displaying the first location information.

After the user reads the first location information, before the first device receives the establishment information, or when the first device receives the establishment information, or after the first device receives the establishment information, even if the first device no longer displays the first location information, after the first device receives the establishment information, this still helps implement sending the first message to the second device. Because the user does not need to maintain continuous display of the first location information on the first screen, this helps simplify a user operation.

In a possible implementation, an information type of the first location information includes at least one of the following: text information, graphic information on a map, and link information.

The information type of the first location information is extended, which helps the second device output, based on the plurality of types of first location information displayed on the first screen, the second location information related to the first location information, and helps extend an application scenario of the method in an embodiment of this application.

In a possible implementation, the first location information is used to describe one or more geographic locations (referred to as first geographic locations).

In a possible implementation, the link information indicates the first device to display a display interface used to describe the first geographic locations.

In a possible implementation, the first location information is displayed on a first display interface of the first screen, and an interface type of the first display interface includes at least one of the following: a web page, a chat interface, a map interface, and a notification interface.

The interface type of the display interface on which the first location information is located is extended, which helps the second device output, based on the first location information displayed on display interfaces of the plurality of interface types displayed on the first screen, the second location information related to the first location information, and helps extend an application scenario of the method in an embodiment of this application.

In a possible implementation, geographic locations described by the location information and the first geographic locations described by the first location information include same geographic locations. Optionally, the geographic locations described by the location information are the first geographic locations. Alternatively, optionally, the geographic locations described by the location information include the first geographic locations. Alternatively, optionally, the first geographic locations include the geographic locations described by the location information. Alternatively, optionally, the first geographic locations are an area or a path, the geographic locations described by the location information are an area or a path, and there is a public area, a public path, or a public point between the first geographic locations and the geographic locations described by the location information.

A type of the location information related to the first location information is extended, which helps enrich a type of the second location information output by the second device, and further helps extend an application scenario of the method in an embodiment of this application.

In a possible implementation, the location information is navigation information, the navigation information describes a first path, and the first path passes through the same geographic locations. In a possible implementation, the first path passes through the first geographic locations. In a possible implementation, that one path passes through one geographic location means that the geographic location is a start location, a passing location (which may also be referred to as a passing point), or an end location of the path.

After the first device displays the first location information on the first screen, the second device may output the navigation information related to the first location information, which helps indicate the user to accurately and quickly arrive at a location related to the first geographic locations.

In a possible implementation, the same geographic locations include at least two geographic locations, and the first message is further used to indicate a first sequence. After receiving the first message, the second device may determine the first path, so that the first path sequentially passes through the at least two geographic locations in the first sequence, and then outputs navigation information that describes the first path.

When the first location information displayed by the first device describes a plurality of geographic locations, the user may expect the second device to output navigation information based on at least two of the geographic locations. The first device sends the first message to indicate the first sequence between the at least two geographic locations, which helps the second device output, without requiring the user to indicate a sequence, the navigation information used to describe the first path that passes through the at least two geographic locations, which helps simplify a user operation.

It is assumed that, the second device further outputs navigation information that describes a second path before receiving the first message. In a possible implementation, the second device may determine an end location of the first path based on an end location of the second path, for example, use the end location of the second path as the end location of the first path. In addition, the second device determines, based on the same geographic locations, a passing location of the first path, where the second path is a path described by the navigation information that is output by the second device before receiving the first message.

In a possible implementation, the second device may determine the end location of the first path based on the same geographic locations. In a possible implementation, it is assumed that the second device further outputs the navigation information that describes the second path before receiving the first message, and the second device may still determine the end location of the first path based on the same geographic locations. In a possible implementation, the second device may use the end location of the second path as the passing location of the first path.

If the second device is outputting the navigation information that describes the second path before receiving the first message, the second device determines the first path based on the second path and the first message, which helps output, based on the first path, navigation information that better meets a user intention, thereby helping reduce operations performed by the user on the second device.

In a possible implementation, the first communication connection is a connection established based on a short-range wireless communication technology.

The short-range wireless communication technology helps more accurately specify a device involved in a corresponding communication connection, and therefore helps the first device more accurately predict a geographic location sharing intention of the user.

In a possible implementation, the short-range wireless communication technology is a Bluetooth technology.

In a possible implementation, the short-range wireless communication technology is a near field communication technology. The user makes the first device and the second device on which NFC communication modules are disposed close to each other (similar to making the first device and the second device tap), which helps the first device obtain establishment information of an NFC communication connection, and helps simplify an operation of the user.

In a possible implementation, the first communication connection is a communication connection between the first device and the second device.

In a possible implementation, that the first device sends a first message to a second device includes: The first device sends the first message to the second device through a second communication connection, where the second communication connection is different from the first communication connection.

In a possible implementation, the first device is a handheld terminal or an apparatus in a handheld terminal, and the second device is an in-vehicle terminal or an apparatus in an in-vehicle terminal; or the first device is an in-vehicle terminal or an apparatus in an in-vehicle terminal, and the second device is a handheld terminal or an apparatus in a handheld terminal. This helps simplify an operation performed by a driver on the terminal in a driving process, thereby helping improve driving safety.

In a possible implementation, the apparatus in the handheld terminal may be a chip system in the handheld terminal.

In a possible implementation, the apparatus in the in-vehicle terminal may be a chip system in the in-vehicle terminal.

A second aspect of the embodiments of the present invention provides a geographic information processing method, where the method includes: A first device displays first location information on a corresponding first screen; and the first device sends a first message to a second device, where the first message indicates the second device to output location information related to the first location information.

In a possible implementation, that the second device outputs the location information related to the first location information may mean that the second device displays, on a corresponding second screen, the location information related to the first location information, or plays the location information related to the first location information in audio.

In a possible implementation, establishment information indicates the first device to establish a first communication connection.

In a possible implementation, in addition to displaying the first location information on a first screen by the first device, a trigger event of sending the first message to the second device by the first device further includes: The first device obtains the establishment information of the first communication connection.

In a possible implementation, the first device may send the first message to the second device based on that the first device displays the first location information on the first screen and receives the establishment information after displaying the first location information.

In a possible implementation, an information type of the first location information includes at least one of the following: text information, graphic information on a map, and link information.

In a possible implementation, the first location information is used to describe one or more geographic locations (referred to as first geographic locations).

In a possible implementation, the link information indicates the first device to display a display interface used to describe the first geographic locations.

In a possible implementation, the first location information is displayed on a first display interface of the first screen, and an interface type of the first display interface includes at least one of the following: a web page, a chat interface, a map interface, and a notification interface.

In a possible implementation, geographic locations described by the location information and the first geographic locations described by the first location information include same geographic locations.

In a possible implementation, the location information is navigation information, and a path described by the navigation information corresponding to the location information passes through the first geographic locations.

In a possible implementation, the same geographic locations include at least two geographic locations, and the first message is further used to indicate a first sequence. After receiving the first message, the second device may determine the path described by the navigation information corresponding to the location information, so that the path sequentially passes through the at least two geographic locations in the first sequence, and then outputs the navigation information that describes the path.

It is assumed that, the second device further outputs navigation information that describes a second path before receiving the first message. In a possible implementation, the second device may determine, based on an end location of the second path, an end location of the path described by the navigation information corresponding to the location information, for example, use the end location of the second path as the end location of the path described by the navigation information corresponding to the location information. In addition, the second device determines, based on the same geographic locations, a passing location of the path described by the navigation information corresponding to the location information, where the second path is a path described by the navigation information that is output by the second device before receiving the first message.

In a possible implementation, the second device may determine, based on the same geographic locations, the end location of the path described by the navigation information corresponding to the location information. In a possible implementation, it is assumed that the second device further outputs the navigation information that describes the second path before receiving the first message, and the second device may still determine, based on the same geographic locations, the end location of the path described by the navigation information corresponding to the location information. In a possible implementation, the second device may use the end location of the second path as a passing location of the path described by the navigation information corresponding to the location information.

It should be noted that, for ease of description, the path described by the navigation information that is related to the first location information and that is indicated by the first message is referred to as the first path. In the specification of this application, the first path is a path described by navigation information that is related to the first location information and that is output by the second device.

In a possible implementation, the first communication connection is a connection established based on a short-range wireless communication technology.

In a possible implementation, the short-range wireless communication technology is a near field communication technology.

In a possible implementation, the first communication connection is a communication connection between the first device and the second device.

In a possible implementation, that the first device sends a first message to a second device includes: The first device sends the first message to the second device through a second communication connection, where the second communication connection is different from the first communication connection.

In a possible implementation, the first device is a handheld terminal or an apparatus in a handheld terminal, and the second device is an in-vehicle terminal or an apparatus in an in-vehicle terminal; or the first device is an in-vehicle terminal or an apparatus in an in-vehicle terminal, and the second device is a handheld terminal or an apparatus in a handheld terminal.

In a possible implementation, the apparatus in the handheld terminal may be a chip system in the handheld terminal.

In a possible implementation, the apparatus in the in-vehicle terminal may be a chip system in the in-vehicle terminal. For a technical effect that can be obtained by the geographic information processing method provided in this embodiment of this application, refer to the technical effect obtained in the foregoing corresponding method embodiment. Details are not described herein again.

A third aspect of the embodiments of the present invention provides a geographic information processing method, where the method includes: A second device receives a first message, where the first message is sent after a first device displays first location information on a corresponding first screen, and the first message indicates the second device to output location information related to the first location information; and the second device outputs, based on the first message, second location information related to the first location information.

It can be learned that, after the first device displays the first location information, the second device receives the first message sent by the first device, which helps implement that the second device can output the location information related to the first location information without a need for a user to manually enter the location information related to the first location information to the second device, thereby simplifying a user operation.

In a possible implementation, that the second device outputs the second location information may be that the second device displays the second location information on a corresponding second screen, or plays the second location information in audio.

In a possible implementation, establishment information indicates the first device to establish a first communication connection.

In a possible implementation, in addition to displaying the first location information on a first screen by the first device, a trigger event of sending the first message to the second device by the first device further includes: The first device obtains the establishment information of the first communication connection.

In a possible implementation, the first device may send the first message to the second device based on that the first device displays the first location information on the first screen and receives the establishment information after displaying the first location information.

In a possible implementation, an information type of the first location information includes at least one of the following: text information, graphic information on a map, and link information.

In a possible implementation, the first location information is used to describe one or more geographic locations (referred to as first geographic locations).

In a possible implementation, the link information indicates the first device to display a display interface used to describe the first geographic locations.

In a possible implementation, the first location information is displayed on a first display interface of the first screen, and an interface type of the first display interface includes at least one of the following: a web page, a chat interface, a map interface, and a notification interface.

In a possible implementation, geographic locations described by the location information and the first geographic locations described by the first location information include same geographic locations.

In a possible implementation, the location information is navigation information, the navigation information describes a first path, and the first path passes through the first geographic locations.

In a possible implementation, the same geographic locations include at least two geographic locations, and the first message is further used to indicate a first sequence. After receiving the first message, the second device may determine the first path, so that the first path sequentially passes through the at least two geographic locations in the first sequence, and then outputs navigation information that describes the first path.

It is assumed that the second device further outputs navigation information that describes a second path before receiving the first message. In a possible implementation, the second device may determine an end location of the first path based on an end location of the second path, for example, use the end location of the second path as the end location of the first path. In addition, the second device determines, based on the same geographic locations, a passing location of the first path, where the second path is a path described by the navigation information that is output by the second device before receiving the first message.

In a possible implementation, the second device may determine the end location of the first path based on the same geographic locations. In a possible implementation, it is assumed that the second device further outputs the navigation information that describes the second path before receiving the first message, and the second device may still determine the end location of the first path based on the same geographic locations. In a possible implementation, the second device may use the end location of the second path as the passing location of the first path.

In a possible implementation, the first communication connection is a connection established based on a short-range wireless communication technology.

In a possible implementation, the short-range wireless communication technology is a near field communication technology.

In a possible implementation, the first communication connection is a communication connection between the first device and the second device.

In a possible implementation, that the first device sends a first message to a second device includes: The first device sends the first message to the second device through a second communication connection, where the second communication connection is different from the first communication connection.

In a possible implementation, the first device is a handheld terminal or an apparatus in a handheld terminal, and the second device is an in-vehicle terminal or an apparatus in an in-vehicle terminal; or the first device is an in-vehicle terminal or an apparatus in an in-vehicle terminal, and the second device is a handheld terminal or an apparatus in a handheld terminal.

In a possible implementation, the apparatus in the handheld terminal may be a chip system in the handheld terminal.

In a possible implementation, the apparatus in the in-vehicle terminal may be a chip system in the in-vehicle terminal.

For a technical effect that can be obtained by the geographic information processing method provided in this embodiment of this application, refer to the technical effect obtained in the foregoing corresponding method embodiment. Details are not described herein again.

A fourth aspect of embodiments of the present invention provides a geographic information processing apparatus, where the apparatus includes: a display module and a communication module; the display module is configured to display first location information on a corresponding first screen; the obtaining module is configured to obtain establishment information of a first communication connection; and the communication module is configured to send a first message to a second device, where the first message indicates the second device to output location information related to the first location information.

In a possible implementation, that the second device outputs the location information related to the first location information may mean that the second device displays, on a corresponding second screen, the location information related to the first location information, or plays the location information related to the first location information in audio.

In a possible implementation, establishment information indicates the first device to establish a first communication connection.

In a possible implementation, the geographic information processing apparatus further includes an obtaining module. In addition to displaying the first location information on the first screen by the display module, a trigger event of sending the first message to the second device by the communication module includes: The obtaining module obtains the establishment information of the first communication connection.

In a possible implementation, the communication module may send the first message to the second device based on that the display module displays the first location information on the first screen, and the obtaining module obtains the establishment information after the display module displays the first location information.

In a possible implementation, an information type of the first location information includes at least one of the following: text information, graphic information on a map, and link information.

In a possible implementation, the first location information is used to describe one or more geographic locations (referred to as first geographic locations).

In a possible implementation, the link information indicates the first device to display a display interface used to describe the first geographic locations.

In a possible implementation, the first location information is displayed on a first display interface of the first screen, and an interface type of the first display interface includes at least one of the following: a web page, a chat interface, a map interface, and a notification interface.

In a possible implementation, geographic locations described by the location information and the first geographic locations described by the first location information include same geographic locations.

In a possible implementation, the location information is navigation information, the navigation information describes a first path, and the first path passes through the first geographic locations.

In a possible implementation, the same geographic locations include at least two geographic locations, and the first message is further used to indicate a first sequence. After receiving the first message, the second device may determine the first path, so that the first path sequentially passes through the at least two geographic locations in the first sequence, and then outputs navigation information that describes the first path.

It is assumed that the second device further outputs navigation information that describes a second path before receiving the first message. In a possible implementation, the second device may determine an end location of the first path based on an end location of the second path, for example, use the end location of the second path as the end location of the first path. In addition, the second device determines, based on the same geographic locations, a passing location of the first path, where the second path is a path described by the navigation information that is output by the second device before receiving the first message.

In a possible implementation, the second device may determine the end location of the first path based on the same geographic locations. In a possible implementation, it is assumed that the second device further outputs the navigation information that describes the second path before receiving the first message, and the second device may still determine the end location of the first path based on the same geographic locations. In a possible implementation, the second device may use the end location of the second path as the passing location of the first path.

In a possible implementation, the first communication connection is a connection established based on a short-range wireless communication technology.

In a possible implementation, the short-range wireless communication technology is a near field communication technology.

In a possible implementation, the first communication connection is a communication connection between the first device and the second device.

In a possible implementation, the communication module is specifically configured to send the first message to the second device through a second communication connection, where the second communication connection is different from the first communication connection.

In a possible implementation, the geographic information processing apparatus is a handheld terminal, and the second device is an in-vehicle terminal; or the geographic information processing apparatus is an in-vehicle terminal, and the second device is a handheld terminal.

A fifth aspect of the embodiments of the present invention provides a geographic information processing apparatus, where the apparatus includes: a communication module and an output module, the communication module is configured to receive a first message, the first message is sent after a first device displays first location information on a corresponding first screen, the first message indicates the output module to output location information related to the first location information, and the output module is configured to output second location information related to the first location information based on the first message.

In a possible implementation, that the output module outputs the second location information may mean that the output module displays the second location information on a corresponding second screen, or mean that plays the second location information in audio.

In a possible implementation, establishment information indicates the first device to establish a first communication connection.

In a possible implementation, in addition to displaying the first location information on a first screen by the first device, a trigger event of sending the first message to the communication module by the first device further includes: The first device obtains the establishment information of the first communication connection.

In a possible implementation, the first message is sent when the first device displays the first location information on the first screen and receives the establishment information after the first device displays the first location information.

In a possible implementation, an information type of the first location information includes at least one of the following: text information, graphic information on a map, and link information.

In a possible implementation, the first location information is used to describe one or more geographic locations (referred to as first geographic locations).

In a possible implementation, the link information indicates the first device to display a display interface used to describe the first geographic locations.

In a possible implementation, the first location information is displayed on a first display interface of the first screen, and an interface type of the first display interface includes at least one of the following: a web page, a chat interface, a map interface, and a notification interface.

In a possible implementation, geographic locations described by the location information and the first geographic locations described by the first location information include same geographic locations.

In a possible implementation, the location information is navigation information, the navigation information describes a first path, and the first path passes through the first geographic locations.

In a possible implementation, the same geographic locations include at least two geographic locations, and the first message is further used to indicate a first sequence. After receiving the first message, the second device may determine the first path, so that the first path sequentially passes through the at least two geographic locations in the first sequence, and then outputs navigation information that describes the first path.

It is assumed that the second device further outputs navigation information that describes a second path before receiving the first message. In a possible implementation, the second device may determine an end location of the first path based on an end location of the second path, for example, use the end location of the second path as the end location of the first path. In addition, the second device determines, based on the same geographic locations, a passing location of the first path, where the second path is a path described by the navigation information that is output by the second device before receiving the first message.

In a possible implementation, the second device may determine the end location of the first path based on the same geographic locations. In a possible implementation, it is assumed that the second device further outputs the navigation information that describes the second path before receiving the first message, and the second device may still determine the end location of the first path based on the same geographic locations. In a possible implementation, the second device may use the end location of the second path as the passing location of the first path.

In a possible implementation, the first communication connection is a connection established based on a short-range wireless communication technology.

In a possible implementation, the short-range wireless communication technology is a near field communication technology.

In a possible implementation, the first communication connection is a communication connection between the first device and the second device.

In a possible implementation, that the communication module receives the first message includes: The communication module receives the first message through a second communication connection, where the second communication connection is different from the first communication connection.

In a possible implementation, the first device is a handheld terminal, and the geographic information processing apparatus is an in-vehicle terminal; or the first device is an in-vehicle terminal, and the geographic information processing apparatus is a handheld terminal.

A sixth aspect of the embodiments of this application provides a geographic information processing system, where the geographic information processing system includes any possible geographic information processing apparatus provided in the fourth aspect of embodiments of this application and any possible geographic information processing apparatus provided in the fifth aspect of embodiments of this application.

A seventh aspect of this application further provides a service providing method, including: When a first preset condition is met between a first device and a second device, the first device sends a first message to the second device, where the first message includes first service information, the first service information indicates to provide a first service, and the first service is a service provided by the first device by running a first application; and the second device runs a second application based on the first message, to provide the first service.

For example, in a process in which a navigation application is run on a mobile phone to provide a navigation service (for example, navigation from a current location to a first address), the mobile phone may obtain and send, to a head unit, first service information used to provide the navigation service, and the head unit may run a second application based on the first service information, to continue to provide the first service (for example, navigation from the current location to the first address).

Optionally, the first preset condition includes: The first device obtains first information from the second device through a first communication connection, where the first information indicates that the second device has a capability of providing the first service.

Optionally, the first information includes first service capability information, the first service capability information indicates one or more service capabilities supported by the second application, and the one or more service capabilities include a first service capability supported by the first application.

Optionally, the first service information includes second service capability information and service content information, the second service capability information indicates the first service capability, and the service content information is obtained from the first application based on the first service capability.

Optionally, that the second device runs a second application based on the first message includes: The second device inputs the service content information into an interface corresponding to the second service capability information.

Optionally, the first information includes service type information, the service type information indicates one or more service types supported by the second application, and the one or more service types include a type of the first service.

Optionally, the first information includes application identifier information, the application identifier information indicates an identifier of the second application, and the identifier of the second application is the same as an identifier of the first application.

Optionally, the first application and the second application are versions on different devices.

Optionally, the first application and the second application are navigation applications, and the first service is used to output navigation information corresponding to a first path to a user; or the first application and the second application are music applications, and the first service is used to output first audio to a user; or the first application and the second application are video applications, and the first service is used to output a first video to a user; or the first application and the second application are picture applications, and the first service is used to output a first image to a user; or the first application and the second application are reading applications, and the first service is used to output a first document to a user.

Optionally, after that the second device runs a second application based on the first message, the method further includes: When the second device meets a second preset condition, the second device sends a second message to the first device, where the second message includes second service information, the second service information indicates to provide a second service, and the second service is a service provided by the second device by running the second application; and the first device runs the first application based on the second message, to provide the second service.

An eighth aspect of this application further provides a service providing method, including: When a first preset condition is met between a first device and a second device, the first device sends a first message to the second device, where the first message includes first service information, the first service information indicates the second device to run a second application to provide a first service, and the first service is a service provided by the first device by running a first application.

Optionally, the first preset condition includes: The first device obtains first information from the second device through a first communication connection, where the first information indicates that the second device has a capability of providing the first service.

Optionally, the first information includes first service capability information, the first service capability information indicates one or more service capabilities supported by the second application, and the one or more service capabilities include a first service capability supported by the first application.

Optionally, the first service information includes second service capability information and service content information, the second service capability information indicates the first service capability, and the service content information is obtained from the first application based on the first service capability.

Optionally, the first information includes service type information, the service type information indicates one or more service types supported by the second application, and the one or more service types include a type of the first service.

Optionally, the first information includes application identifier information, the application identifier information indicates an identifier of the second application, and the identifier of the second application is the same as an identifier of the first application.

Optionally, the first application and the second application are versions on different devices.

Optionally, the first application and the second application are navigation applications, and the first service is used to output navigation information corresponding to a first path to a user; or the first application and the second application are music applications, and the first service is used to output first audio to a user; or the first application and the second application are video applications, and the first service is used to output a first video to a user; or the first application and the second application are picture applications, and the first service is used to output a first image to a user; or the first application and the second application are reading applications, and the first service is used to output a first document to a user.

According to a ninth aspect, this application further provides a service providing method, including: A second device receives a first message, where the first message is sent by a first device to the second device when a first preset condition is met between the first device and the second device, the first message includes first service information, the first service information indicates to provide a first service, and the first service is a service provided by the first device by running a first application; and the second device runs a second application based on the first message, to provide the first service.

Optionally, the first preset condition includes: The first device obtains first information from the second device through a first communication connection, where the first information indicates that the second device has a capability of providing the first service.

Optionally, the first information includes first service capability information, the first service capability information indicates one or more service capabilities supported by the second application, and the one or more service capabilities include a first service capability supported by the first application.

Optionally, the first service information includes second service capability information and service content information, the second service capability information indicates the first service capability, and the service content information is obtained from the first application based on the first service capability.

Optionally, that the second device runs a second application based on the first message includes: The second device inputs the service content information into an interface corresponding to the second service capability information.

Optionally, the first information includes service type information, the service type information indicates one or more service types supported by the second application, and the one or more service types include a type of the first service.

Optionally, the first information includes application identifier information, the application identifier information indicates an identifier of the second application, and the identifier of the second application is the same as an identifier of the first application.

Optionally, the first application and the second application are versions on different devices.

Optionally, the first application and the second application are navigation applications, and the first service is used to output navigation information corresponding to a first path to a user; or the first application and the second application are music applications, and the first service is used to output first audio to a user; or the first application and the second application are video applications, and the first service is used to output a first video to a user; or the first application and the second application are picture applications, and the first service is used to output a first image to a user; or the first application and the second application are reading applications, and the first service is used to output a first document to a user.

Optionally, after that the second device runs a second application based on the first message, the method further includes: When the second device meets a second preset condition, the second device sends a second message to the first device, where the second message includes second service information, the second service information indicates to provide a second service, and the second service is a service provided by the second device by running the second application; and the first device runs the first application based on the second message, to provide the second service.

A tenth aspect of this application provides a service providing apparatus, including: a sending module, configured to: when a first preset condition is met between the service providing apparatus and a second device, send a first message to the second device, where the first message includes first service information, the first service information indicates the second device to run a second application to provide a first service, and the first service is a service provided by the service providing apparatus by running a first application.

For another possible implementation, refer to a possible implementation of the eighth aspect. Details are not described herein again.

According to an eleventh aspect, this application provides a service providing apparatus, including: a receiving module, configured to receive a first message, where the first message is sent by a first device to the service providing apparatus when a first preset condition is met between the first device and the service providing apparatus, the first message includes first service information, the first service information indicates to provide a first service, and the first service is a service provided by the first device by running a first application; and a running module, configured to run a second application based on the first message, to provide the first service.

For another possible implementation, refer to a possible implementation of the ninth aspect. Details are not described herein again.

A twelfth aspect of this application provides a service providing system, including the service providing apparatus provided in the fourteenth aspect or the fifteenth aspect.

According to a thirteenth aspect, an embodiment of this application provides a computing device, where the computing device includes a processor and a memory, the processor is coupled to the memory, and when executing program code stored in the memory, the processor can perform the method performed by the first device in any possible implementation of the first aspect, or perform the method performed by the second device in any possible implementation of the first aspect, and can perform the method performed by the first device in any possible implementation of the second aspect, perform the method performed by the second device in any possible implementation of the third aspect, or perform the method performed in any possible implementation of the seventh aspect, the eighth aspect, or the ninth aspect.

Optionally, the program code is stored in a memory outside the computing device. When the program code is decoded and executed by the processor of the computing device, the memory in the computing device temporarily stores some or all of the program code. Optionally, some content of the program code is stored in a memory outside the computing device, and other content of the program code is stored in the memory inside the computing device.

In a possible implementation, the computing device may further include a communication interface. The processor of the computing device receives or sends the first message through the communication interface.

In a possible implementation, the computing device is a terminal, for example, a handheld terminal or an apparatus in a handheld terminal, or an in-vehicle terminal or an apparatus in an in-vehicle terminal.

A fourteenth aspect of this application provides a chip system, where the chip system includes a processor and an interface circuit, the processor is coupled to a memory through the interface circuit, and the processor is configured to execute program code in the memory, to perform the method described in any possible implementation of the first aspect, or perform the method performed by the second device in any possible implementation of the first aspect, or perform the method performed by the first device in any possible implementation of the second aspect, or perform the method performed by the second device in any possible implementation of the third aspect, or perform the method performed in any possible implementation of the seventh aspect, the eighth aspect, or the ninth aspect. The chip system may include a chip, or may include a chip and another discrete component.

A fifteenth aspect of this application provides a computer-readable storage medium. The computer-readable storage medium stores program code. When the program code is run on a computing device, the computing device can perform the method performed by the first device in any possible implementation of the first aspect, or perform the method performed by the second device in any possible implementation of the first aspect, and can perform the method performed by the first device in any possible implementation of the second aspect, or perform the method performed by the second device in any possible implementation of the third aspect, or perform the method performed in any possible implementation of the seventh aspect, the eighth aspect, or the ninth aspect.

A sixteenth aspect of this application provides a computer program product. When program code included in the computer program product is executed by a computing device, the method described in any possible implementation of the first aspect is performed, or the method performed by the second device in any possible implementation of the first aspect is performed, or the method performed by the first device in any possible implementation of the second aspect is performed, or the method performed by the second device in any possible implementation of the third aspect is performed, or the method performed in any possible implementation of the seventh aspect, the eighth aspect, or the ninth aspect is performed.

The apparatuses provided in the embodiments of this application may be configured to perform the methods in the foregoing corresponding embodiments. Therefore, for technical effects that can be obtained by the apparatus embodiments of this application, refer to technical effects obtained in the foregoing corresponding method embodiments. Details are not described herein again.

It should be understood that the geographic information processing solution provided in embodiments of this application may be used to simplify an operation performed by a user on a device (for example, a terminal). In particular, when the first device displays first location information, the first device may send a first message to a second device, to indicate the second device to output location information related to the first location information, to simplify a user operation.

In addition, the first device may indicate, by using the first message, the second device to output navigation information related to the first location information, so that the user accurately reaches or passes, based on a path described by the navigation information, for example, a geographic location described by the first location information.

In addition, the first message indicates, based on the first message, that the path passes through at least two geographic locations, and the first device indicates a sequence between the at least two geographic locations, so that the second device outputs corresponding navigation information without a need for a user to specify a sequence.

In addition, based on that the second device outputs navigation information that describes another path before receiving the first message, the second device may update a navigation path by comprehensively referring to location information carried in the first message and the another path, and output updated navigation information, which helps output navigation information that better meets a user intention.

In addition, another trigger event other than "displaying the first location information" may be added to output location information that better meets a user intention. For example, the another trigger event may further include that the first device obtains establishment information of an NFC communication connection. In this way, after a user reads the first location information, the first device and the second device on which the NFC communication module is disposed are brought close to each other (similar to making the first device and the second device tap), which helps trigger the first device to send the first message to the second device, and helps simplify a user operation on a basis of triggering a process of sending the first message more accurately.

DESCRIPTION OF EMBODIMENTS

Figure 1:
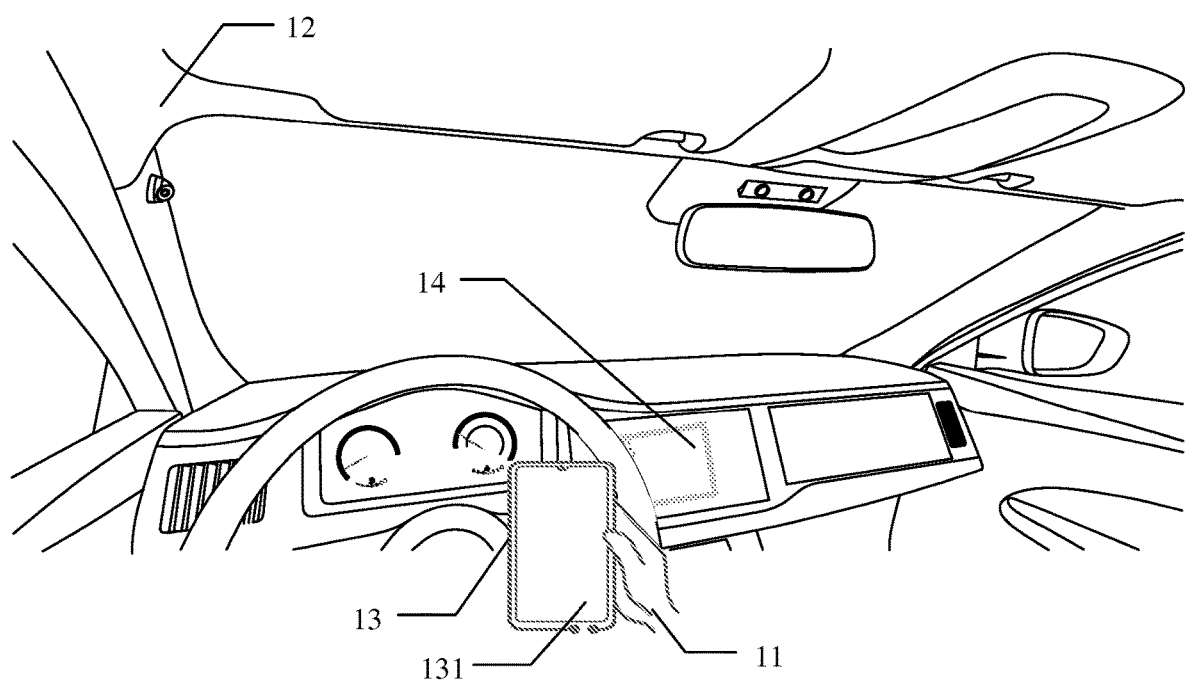
FIG. 1 shows a possible scene inside a vehicle.

An embodiment of this application provides a communication system. The communication system includes a plurality of terminals. The terminal is, for example, user equipment such as a mobile phone, a tablet computer, a smartwatch, or a head unit. In addition, any two terminals in the communication system can provide a tap-to-transfer service from one terminal (referred to as an initiating terminal) to another terminal (referred to as an execution terminal).

A first device and a second device in the communication system are used as an example. A tap-to-transfer service from the first device to the second device means that a user can transfer, to the second device by making the first device and the second device "tap", a first service that is being provided by the first device, and the second device continues to provide the first service. In this example, the first device and the second device are respectively an initiating terminal and an execution terminal of a tap-to-transfer service. "Tap" may mean that a communication connection is established between the first device and the second device, for example, the first device is close to a near field communication (near field communication, NFC) tag of the second device to establish an NFC connection, or a Bluetooth low energy (bluetooth low energy, BLE) connection is established between the first device and the second device, or a Wireless Fidelity (wireless fidelity, Wi-Fi) connection is established between the first device and the second device.

For example, the first device and the second device are a mobile phone and a head unit respectively. After a driver enters an address of a destination in a navigation application 1 of the mobile phone and places the mobile phone close to the head unit, a navigation application 2 of the head unit may perform navigation on the destination. In this application, an application that is in the initiating terminal and that provides a first service is referred to as a first application, and an application that is in the execution terminal and that provides the first service is referred to as a second application. In this example, the navigation application 1 and the navigation application 2 are respectively a first application and a second application of a tap-to-transfer service.

The following describes a possible manner of implementing a tap-to-transfer service in the communication system.

Optionally, all terminals in the communication system support a transfer protocol, and any two terminals may provide a tap-to-transfer service between the two terminals according to the transfer protocol.

The following describes the transfer protocol by using an example.

First, a transfer protocol may define a transfer protocol template.

The transfer protocol template may include one or more pieces of the following information (1) to (6): Any type of information is not limited in this application. For example, the information may be binary, octal, decimal, or the like.

(1) Service Header Information (Type)

The information may indicate a type of information exchanged between the first device and the second device in the transfer process. For example, "0" represents supplementary information of the second application, and may indicate that the second device supports the tap-to-transfer service. For example, "1" represents a first message, and "2" represents a second message.

(2) Service Type Information (Business Type)

The information may indicate a service type supported by the tap-to-transfer service. For example, a service type supported by the tap-to-transfer service may include a navigation service, a projection service, a voice transmission service, and the like. For example, the information has a plurality of possible values, and each value represents a service type. For example, "0" indicates the navigation service, "1" indicates the voice transmission service, and "2" indicates the projection service.

(3) Priority Information (Priority)

The information has a plurality of possible values, and may indicate an execution priority. For example, "0" indicates priority 1, "1" indicates priority 2, and "2" indicates priority 3. A smaller value indicates a higher priority.

Optionally, each value corresponds to one service type.

(4) First Application Information (Source Application)

The information may indicate an identifier of the first application.

(5) Second Application Information (Execute Application)

The information may indicate an identifier of the second application.

(6) Service Information (Business Capability)

The information may include service capability information, and the service capability information may indicate a service capability supported by the first application or the second application. The information has a plurality of possible values, and each value represents a service capability.

Optionally, the service capability information includes two pieces of sub-information, where first sub-information represents a service type, and second sub-information represents an execution action of the service type. For example, the first sub-information may be 0, indicating a navigation capability. The second sub-information may be any one of "0" to "4". Herein, "0" indicates that a navigation destination can be input, "1" indicates that a planned path can be input, "2" indicates that HUD display is supported, "3" indicates that navigation voice playing is supported, and "4" indicates that AR navigation is supported. Optionally, the protocol supports flexible extension of service execution capability information.

Second, the transfer protocol can define a transfer process.

For example, the transfer protocol may define a tap-to-transfer procedure (referred to as a tap-to-initiate procedure) of the initiating terminal and a tap-to-transfer procedure (referred to as a tap-to-execute procedure) of the execution terminal. In addition, the transfer protocol may further define prerequisites of the tap-to-initiate procedure and the tap-to-execute procedure separately.

In the following, a process in which the first device and the second device in the communication system provide a tap-to-transfer service from the first device to the second device according to the transfer protocol is used as an example. A prerequisite and a process of a touch-to-initiate process in the transfer protocol are first described.

A prerequisite (or referred to as a first preset condition) for the first device to perform a tap-to-initiate procedure may include at least one of the following condition a1 and condition a2.

Condition a1: the First Device Provides the First Service by Running the First Application.

The first device may obtain an identifier of an application that supports the tap-to-initiate procedure. When the first device runs the application that supports the tap-to-initiate procedure, the first device may determine that the application is the first application of the tap-to-transfer service, and a service provided by the application is the first service of the tap-to-transfer service.

Types of the first application and the second application are not limited in this application. For example, the first application and the second application are navigation applications, and the first service is used to output navigation information corresponding to a first path to a user. Alternatively, the first application and the second application are music applications, and the first service is used to output first audio to a user. Alternatively, the first application and the second application are video applications, and the first service is used to output a first video to a user. Alternatively, the first application and the second application are picture applications, and the first service is used to output a first image to a user. Alternatively, the first application and the second application are reading applications, and the first service is used to output a first document to a user.

Condition a2: the First Device Obtains the First Information from the Second Device.

The second application is an application of the second device, and is configured to provide the tap-to-transfer service together with the first application, and is configured to continue to provide the first service provided by the first application.

For example, the first information may be obtained by the second device by filling in the transfer protocol template.

A communication method used by the first device to obtain the first information from the second device is not limited in this application. The first device may obtain the first information from the second device in a wired communication or wireless communication manner. The wireless communication manner may be a near field communication (near field communication, NFC) technology, a Bluetooth low energy (Bluetooth low energy, BLE) connection, a wireless fidelity (wireless fidelity, Wi-Fi) connection, or the like. For example, the second device may write the first information into an NFC tag of the second device, and the first device obtains the first information by approaching the NFC tag of the second device.

Optionally, the first information indicates that the second device has a capability of providing the first service.

Optionally, the first information may include protocol header information. For example, the information may be "0". After obtaining information from the second device, if "0" is obtained through parsing, the first device determines that the first information is obtained.

Optionally, the first information may include first service capability information, and the first service capability information indicates one or more service capabilities supported by the second application. The first service capability information may include one or more pieces of service capability information, and each piece of service capability information indicates a type of a service capability supported by the second application. For example, the information may include "0:0", "0:1", "0:2", "0:3", and "0:4". Optionally, if the one or more service capabilities include the first service capability supported by the first application, it may be determined that the second device has the capability of providing the first service.

Optionally, the first information may further include application identifier information, and the application identifier information indicates an identifier of the second application. In this application, the application identifier information in the first information may be referred to as second application information for short. For example, the information may be ID-navigation 2. Optionally, the identifier of the second application is the same as the identifier of the first application. Optionally, the first application and the second application are versions on different devices.

Optionally, the first information may further include service type information. It is assumed that the second device includes a plurality of applications used to execute a tap-to-transfer procedure, and service types of the plurality of applications may be different. For example, the plurality of applications include the navigation application 2 and an audio application 2, and service type information of the navigation application 2 and service type information of the audio application 2 are respectively "0" and "1". The first device may select an application whose service type is the same as that of the first application as the second application, and use the first information of the application as information of the second application. It is assumed that the first application is the navigation application 1, and the first device determines, by obtaining "0" through parsing, that the second application of the navigation application 1 is the navigation application 2. It is assumed that the first application includes the navigation application 1 and an audio application 1, and the first device further determines, by obtaining "1" through parsing, that the second application of the audio application 1 is the audio application 2. In addition, one application may support one or more service types.

It can be learned that the first information carries service type information, which helps support concurrency of a plurality of services. The plurality of services are distinguished by using the service type information. For example, tap-to-transfer services such as tap-to-navigate, tap-to-project, and tap-to-share audio between different terminals may be supported.

The protocol header information, the service capability information, and the second application information in the first information may be shown in Table 1.

TABLE 1

| Service header | Service type | Second application | Service information | | | | |
|---|---|---|---|---|---|---|---|
| 0 | 0 | ID-navigation 2 | 0:0 | 0:1 | 0:2 | 0:3 | 0:4 |

When the first device determines, according to the transfer protocol, that the prerequisite of the tap-to-initiate procedure is met, the first device may execute the tap-to-initiate procedure according to the transfer protocol. A process in which the first device executes the tap-to-initiate procedure according to the transfer protocol may include S101.

S101: The first device sends a first message to the second device.

When the first preset condition is met between the first device and the second device, the first device may send the first message to the second device. The first message includes first service information, the first service information indicates to provide a first service, and the first service is a service provided by the first device by running a first application.

Optionally, the first service information includes second service capability information and service content information, the second service capability information indicates the first service capability, and the service content information is obtained from the first application based on the first service capability.

Optionally, step S101 may include steps S1011 and S1012.

S1011: The first device obtains second information of the first application.

For example, the first device may fill in a transfer protocol template to obtain the second information.

The second information may include service information. The service information may include one or more pieces of service capability information and content information (or referred to as service content information) corresponding to each piece of service capability information. The service capability information may indicate a service capability invoked by the first application to provide the first service. The content information corresponding to the service type information may indicate content information of a corresponding service capability.

It is assumed that the first device starts a navigation application 1, the navigation application 1 obtains a navigation end point (for example, an address 1) entered by a user, starts navigation path planning, obtains a navigation path (for example, a path 1) selected by the user, and plays navigation information (for example, voice content 1) by using a voice. In this case, service capabilities invoked by the navigation application 1 to provide a navigation service include the navigation end point, the navigation path, and voice playback, and content information of each service capability includes the address 1, the path 1, and the voice content 1.

Optionally, the second information may further include first application information (that is, identification information of the first application).

Optionally, the second information may further include service type information.

Optionally, the second information may further include priority information.

The service information, the service type information, the priority information, and the second application information in the second information may be shown in Table 2.

TABLE 2

| Service type | Priority | First application | Service information | | | |
|---|---|---|---|---|---|---|
| 0 | 0 | Navigation 1 | 0:0 Address 1 | 0:1 Path 1 | 0:3 | Voice content 1 |

S1012: The first device sends the first message to the second device based on the first information and the second information.

After obtaining the first information and the second information, the first device may send the first message to the second device based on the second information and the first information.

It is assumed that the second device obtains second information of a plurality of first applications, and the second device may match a corresponding second application for each first application based on the service type information. Then, the first device may send the first message to the second device based on each piece of second information and corresponding first information. Alternatively, the first device may send the first message to the second device based on second information with a highest priority and corresponding first information, and does not send the first message to the second device based on other second information and corresponding first information.

The first message may include the first service information, and the first service information may include the second service capability information and the service content information. The second service capability information may indicate all or a part of service capabilities jointly supported by the first application and the second application, and the content information may indicate content information of a second service capability.

For example, the first device may compare service capabilities of the first application with service capabilities of the second application, use a common service capability of the first application and the second application as the first service capability, and send the second service capability of the first application and corresponding content information to the second device.

If all or a part of service capabilities jointly supported by the first application and the second application do not exist, the first application may not send the first message to the second device.

Optionally, the first message may further include the service type information and/or the second application information, and may indicate the second device to determine the second application.

Optionally, the first message may further include protocol header information. For example, the information may be "1", and may indicate the second device to execute a tap-to-execute procedure based on the first message.

Optionally, the first message may further include the first application information.

The protocol header information, the first service information, and the service type information in the first message may be shown in Table 3.

TABLE 3

| Service header | Service type | First service information | | | | | |
|---|---|---|---|---|---|---|---|
| 1 | 0 | 0:0 | Address 1 | 0:1 | Path 1 | 0:3 | Voice content 1 |

A communication manner used by the first device to send the first message to the second device is not limited in this application. The first device may send the first message to the second device in a wired communication or wireless communication manner. The wireless communication manner may be an NFC technology, a BLE connection, a Wi-Fi connection, or the like.

After receiving the first message, the second device may execute a tap-to-execute procedure based on the first message. The following uses the second device as an example to describe a prerequisite and a process of a tap-to-execute procedure in the transfer protocol.

The prerequisite for the second device to perform the tap-to-execute procedure may include a condition b1. Condition b1: the Second Device Receives the First Message.

After receiving information from the first device, if "1" is obtained through parsing, the second device may determine that the first message is received from the first device.

When the second device determines, according to the transfer protocol, that the prerequisite of the tap-to-execute procedure is met, the second device may execute the tap-to-execute procedure according to the transfer protocol. A process in which the second device executes the tap-to-execute procedure according to the transfer protocol may include step S102.

S102. The second device runs the second application based on the first message, to execute the first service.

Optionally, the second device may input the service content information to an interface corresponding to the second service capability information.

After receiving the first message from the first device, the second device may obtain the first service information through parsing, and then may transfer the first service information to the second application.

A method for transferring the first service information by the second device to the second application is not limited in this application. For example, the second device may determine an input interface of the second application by parsing the second service capability information in the first service information, and may input each piece of content information into a corresponding interface by parsing content information corresponding to the second service capability information. Input content may be the content information or information obtained after format conversion is performed on the content information. It is assumed that the second device obtains, through parsing, the first service information shown in Table 3. The second device may input the "address 1" into an input interface of a navigation end point of the second application based on "0:0", input the "path 1" into an input interface of a navigation path of the second application based on "0:1", and input the "voice content 1" into an input interface of voice playback of the second application based on "0:3".

A method for determining the second application by the second device is not limited in this application. For example, the second application may be an application that is in the second device and that is set by a user or a default application in a system, or may be an application indicated by the service type information or the second application information in the first message.

After transferring the first service information to the second application, the second device may run the second application, to continue to provide the first service provided by the first application. For example, a navigation service provided by the navigation application 2 uses the address 1 as an end point and uses the path 1 as a navigation path to play the voice content 1, which is equivalent to transferring the navigation service provided by the navigation application 1 of the first device to the second device, and the second device continues to provide the navigation service.

Optionally, the second device may obtain a service capability of the navigation 2, for example, search for the service capability of the navigation 2 by using execution information of the navigation 2. When the navigation 2 further supports another service capability (referred to as an extended capability) other than the service capability indicated by service information, the second device may further prompt the user of the extended capability. The service capability supported by the navigation 2 is shown in Table 3. In this case, the extended capability of the navigation 2 includes HUD display indicated by "0:2" and AR display indicated by "0:4". The second device may prompt the user to select HUD display or AR display by using a side pop-up box, or the like.

Optionally, the terminals in the communication system may further provide a reverse transfer service of the tap-to-transfer service on the basis of providing the tap-to-transfer service. The reverse transfer service of the tap-to-transfer service indicates that after the first service is transferred to the execution terminal, the execution terminal may further reversely transfer the first service or the second service to the initiating terminal.

For example, the first device and the second device are a mobile phone and a head unit respectively. After a navigation service for a navigation end point of a navigation application 1 of the mobile phone is transferred to the head unit, when a user leaves a vehicle, a navigation service provided by a navigation application 2 may be transferred to the navigation application 1, and the mobile phone continues to provide the navigation service for the user.

Optionally, the terminals in the communication system may provide the reverse transfer service of the tap-to-transfer service between the terminals according to the transfer protocol.

The transfer protocol may define a reverse initiation procedure of the execution terminal and a reverse execution procedure of the initiating terminal. In addition, the transfer protocol may further define prerequisites of the reverse initiation procedure and the reverse execution procedure.

In the following, a process in which the first device and the second device in the communication system provide a reverse transfer service from the second device to the first device according to the transfer protocol is used as an example, and a prerequisite and a process of the reverse initiation procedure in the transfer protocol are first described.

This prerequisite is not limited in this application. For example, a prerequisite (or referred to as a second preset condition) for performing the reverse initiation procedure by the second device may include that the second application is closed or suspended, and/or a user leaves the second device.

For example, the first device and the second device are respectively a handheld terminal and an in-vehicle terminal. The prerequisite (or referred to as the second preset condition) for the second device to perform the reverse initiation procedure may include a condition c1 and/or a condition c2.
Condition c1: the User Leaves the Vehicle.

A method for determining, by the second device, whether the condition c1 is met is not limited in this application. For example, the second device may obtain a signal indicating that a door is opened, and the door may be any door of the vehicle or a door corresponding to a driver.

Condition c2: the Second Device Provides a Second Service by Running the Second Application.

When the second device determines, according to the transfer protocol, that the prerequisite of the reverse initiation procedure is met, the second device may execute the reverse initiation procedure according to the transfer protocol. A process in which the second device executes the reverse initiation procedure according to the transfer protocol may include step S103.

S103: The second device sends a second message to the first device.

When the second device meets the second preset condition, the second device may send the second message to the first device. The second message includes second service information, the second service information indicates to provide a second service, and the second service is a service provided by the second device by running the second application.

The second service may be the same as or different from the first service. For example, the first application and the second application are navigation applications, and the second service may be used to output navigation information corresponding to a second path to the user. Alternatively, for example, the first application and the second application are music applications, and the second service is used to output second audio to the user. Alternatively, for example, the first application and the second application are video applications, and the second service is used to output a second video to the user. Alternatively, for example, the first application and the second application are picture applications, and the second service is used to output a second image to the user. Alternatively, for example, the first application and the second application are reading applications, and the second service is used to output a second document to the user.

Optionally, step S103 may include S1031 and S1032.

S1031: The second device obtains third information of the second application.

When the second device determines, according to the transfer protocol, that the prerequisite of the reverse initiation procedure is met, the second device may obtain the third information of the second application. The third information of the second application may include second service information, and the second service information may include third service capability information and service content information (content information for short) corresponding to the third service capability information. The third service capability information may indicate a service capability invoked by the second application to provide the second service, and the content information may indicate content information of the corresponding service capability. Optionally, the third service capability information may include a part or all of the first service capability information or the second service capability information. Optionally, the third service capability information does not indicate a service capability that is not invoked by the second application.

For example, it is assumed that the user does not change the navigation end point of the navigation application 2 (that is, the navigation end point is still the address 1), but adjusts the navigation path in the navigation application 2, to adjust the path 1 to the path 2, and the user disables a voice playback function of the navigation application 2. In this case, the third service capability information of the navigation application 2 may include two pieces of service capability information. One piece of service capability information and content information of the service capability information respectively indicate the navigation end point and the "address 1", and the other piece of service capability information and content information of the service capability information respectively indicate the navigation path and the "path 2".

S1032: The second device sends the second message to the first device based on the third information of the second application.

After obtaining the third information of the second application, the second device may send the second message to the first device.

The second message may include the third information of the second application or the second service information in the third information.

Optionally, the second message may further include service type information and/or first application information, and may indicate the first device to determine the first application.

Optionally, the second message may further include protocol header information. For example, the information may be "2", and may indicate the first device to execute a reverse execution procedure based on the second message.

The protocol header information, the second service information, and the service type information in the second message may be shown in Table 4.

TABLE 4

| Service header | Service type | Second service information | | | |
|---|---|---|---|---|---|
| 2 | 0 | 0:0 | Address 1 | 0:1 | Path 2 |

A communication manner used by the second device to send the second message to the first device is not limited in this application. The second device may send the second message to the first device in a wired communication or wireless communication manner. The wireless communication manner may be an NFC technology, a BLE connection, a Wi-Fi connection, or the like.

After receiving the second message, the first device may execute the reverse execution procedure based on the second message. The following uses the first device as an example to describe a prerequisite and a process of the reverse execution procedure in the transfer protocol.

The prerequisite for the first device to execute the reverse execution procedure may include a condition d1.

Condition d1: the First Device Receives the Second Message.

After receiving information from the second device, if "2" is obtained through parsing, the first device may determine that the second message is received from the second device.

When the first device determines, according to the transfer protocol, that the prerequisite of the reverse execution procedure is met, the first device may execute the reverse execution procedure according to the transfer protocol. A process in which the first device executes the reverse execution process according to the transfer protocol may include step S104.

S104: The first device runs the first application based on the second message, to provide the second service.

After receiving the second message from the second device, the first device may obtain the second service information through parsing, and then may transfer the second service information to the first application.

A method for transferring the second service information by the first device to the first application is not limited in this application. For example, the first device may determine an input interface of the first application by parsing the third service capability information in the second service information, and may input each piece of content information into a corresponding interface by parsing the content information corresponding to the third service capability information. Input content may be the content information or information obtained after format conversion is performed on the content information. It is assumed that the second device obtains, through parsing, the third service capability information shown in Table 4. The second device may input the "address 1" into an input interface of a navigation end point of the first application based on "0:0", and input the "path 2" into an input interface of the navigation path of the first application based on "0:1".

A method for determining the first application by the first device is not limited in this application. For example, the first application may be an application that is in the first device and that is set by the user or a default application in the system, or may be an application indicated by the service type information or the first application information in the second message.

After transferring the second service information to the first application, the first device may run the first application, to continue to provide the second service provided by the second application. For example, a navigation service provided by the navigation application 1 uses the address 1 as an end point and uses the path 2 as a navigation path, which is equivalent to reversely transferring the navigation service provided by the navigation application 2 of the second device to the first device, and the first device continues to provide the navigation service.

If the second service is a navigation service, optionally, after running the first application, the first device may set a navigation model of the first application to a walking navigation mode.

For ease of understanding, the following describes an example of a possible application scene in an embodiment of this application with reference to FIG. 1. This application may be further applied to another application scene, and FIG. 1 is merely used as an example.

Figure 2:
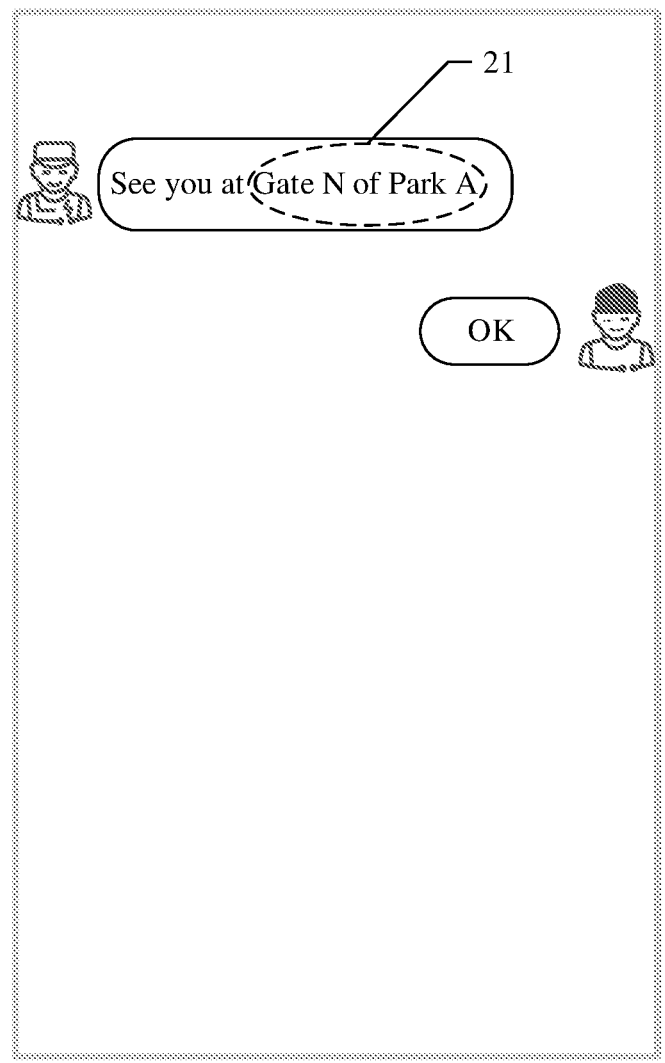
FIG. 2 shows a possible display interface of a mobile phone 13.
Figure 3:
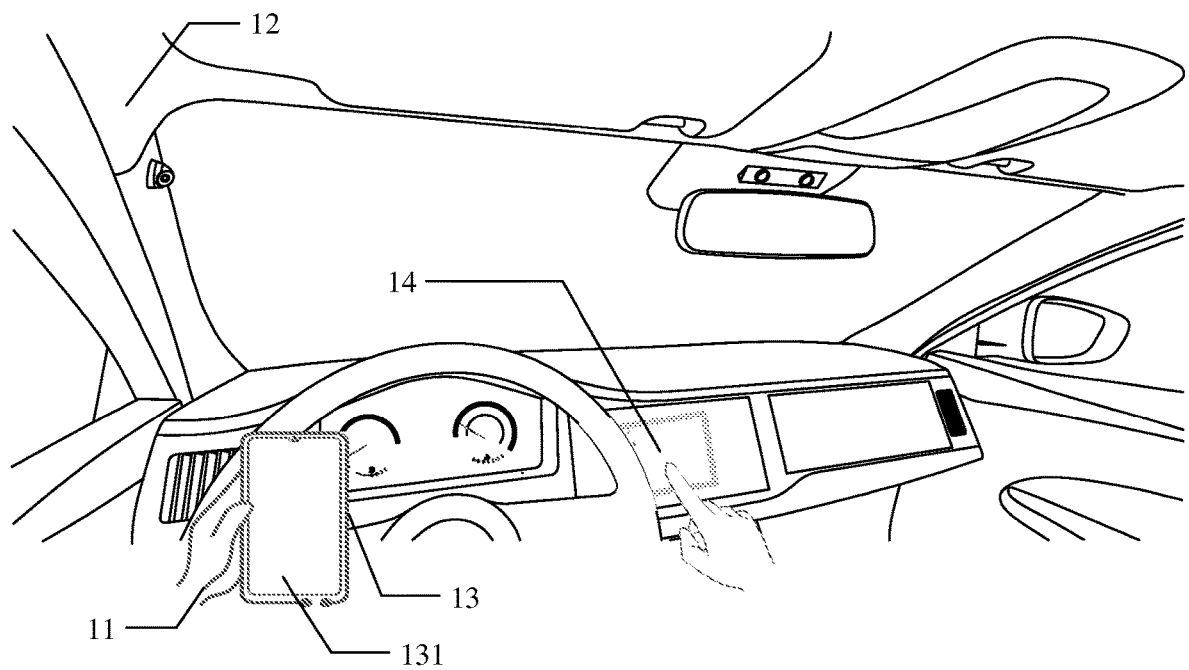
FIG. 3 shows a possible scene after the scene shown in FIG. 1.

FIG. 1 depicts a scene inside a vehicle 12 from a perspective of a driver 11 (FIG. 1 shows only a hand of the driver 11). The scene further includes a mobile phone 13 and a head unit 14 in the vehicle 12. It is assumed that in the scene shown in FIG. 1, a display interface shown in FIG. 2 is displayed on a screen 131 of the mobile phone 13. The display interface shown in FIG. 2 is a chat interface. Refer to FIG. 2. Chat content of the display interface includes location information "Gate N of Park A". For ease of description, the location information is referred to as first location information. The first location information describes a geographic location (that is, a geographic location at which Gate N of Park A is located). It is assumed that the driver 11 expects that the head unit 14 can output location information related to the "Gate N of Park A". For ease of description, location information related to the first location information is referred to as second location information. For example, the driver 11 expects that the second location information output by the head unit 14 is navigation information with Gate N of Park A as an end point. In this case, the driver 11 needs to memorize text information. Then, as shown in FIG. 3, the driver 11 enters the text information "Gate N of Park A" to a navigation application (application program, APP) of the head unit 14, and operates the head unit 14 to display the navigation information with Gate N of Park A as the end point shown in FIG. 4.

After the mobile phone 13 displays the first location information, the driver 11 needs to memorize the first location information, and then manually operate the second device, so that the second device outputs the second location information related to the first location information. This operation is complex. If the driver 11 is driving, a risk of a driving accident is increased.

To resolve the foregoing technical problem, embodiments of this application provide a geographic information processing method and apparatus. The following first describes a geographic information processing method in an embodiment of this application.

The geographic information processing method in this embodiment of this application relates to at least two devices, and the at least two devices are respectively referred to as a first device and a second device.

In a possible implementation, both the first device and the second device are terminals. In a possible implementation, the first device is a handheld terminal (for example, the mobile phone 13 shown in FIG. 1) or a chip in the handheld terminal, and the second device is an in-vehicle terminal (for example, the head unit 14 shown in FIG. 1) or a chip system in the in-vehicle terminal. Alternatively, the first device is an in-vehicle terminal (for example, the head unit 14 shown in FIG. 1) or a chip system in an in-vehicle terminal, and the second device is a handheld terminal (for example, the mobile phone 13 shown in FIG. 1) or a chip system in a handheld terminal.

The handheld terminal is not limited to a mobile phone in embodiments of this application. Optionally, the handheld terminal may be another handheld mobile device, for example, a tablet computer. Alternatively, optionally, the handheld terminal may be a wearable device, for example, a smartwatch or smart glasses. The chip system in the handheld terminal may be a system-on-a-chip (system-on-a-chip, Soc) or the like. Optionally, the in-vehicle terminal is not limited to a head unit in embodiments of this application. Optionally, the in-vehicle terminal may be, for example, an in-vehicle computer (computer, PC). The chip system in the in-vehicle terminal may be an in-vehicle chip, a data processing chip, or the like.

Figure 5:
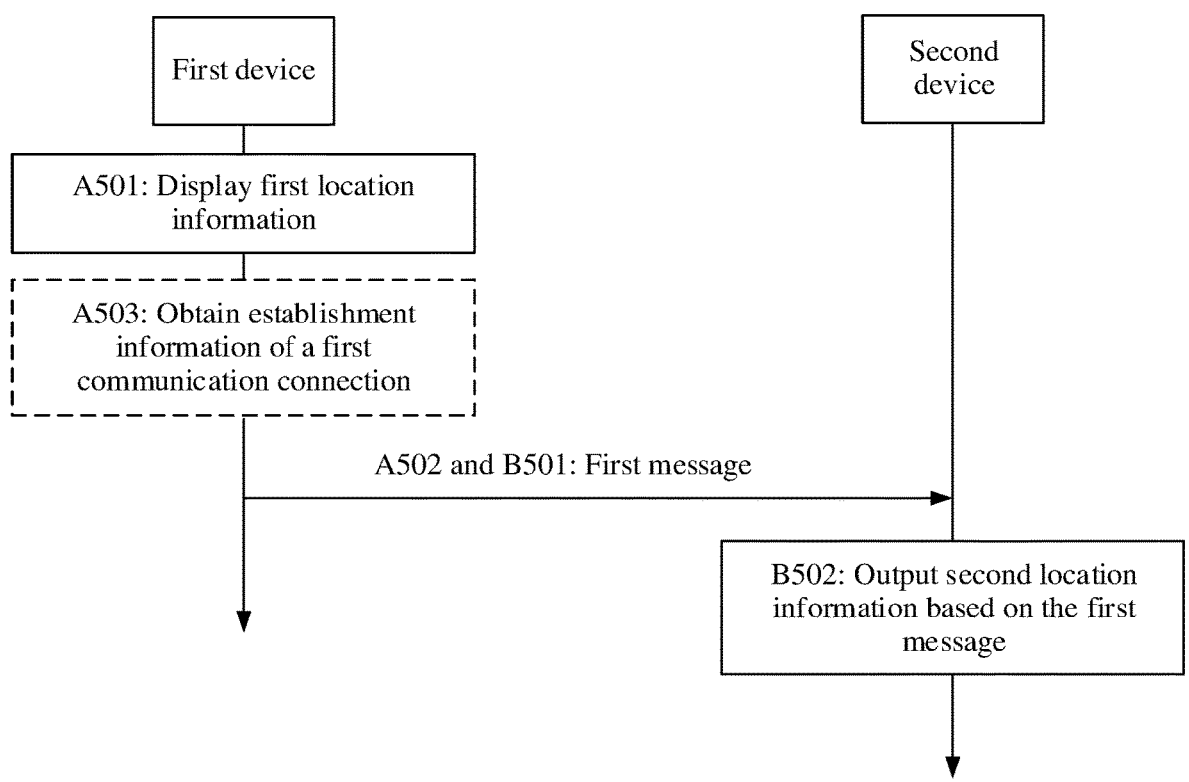
FIG. 5 shows steps of a possible embodiment of a geographic information processing method according to this application.

Refer to FIG. 5. A possible embodiment of the geographic information processing method in this application may include step A501 and step A502.

A501: A first device displays first location information on a corresponding first screen.

The first device can display the first location information. In a possible implementation, the first device displays the first location information through a first screen of a first display device. Based on that a display device (for example, a liquid crystal display device or a projection device) is disposed on the first device, optionally, the first display device may be a display device of the first device, and the first screen is a screen of the first device (for example, the screen 131 shown in FIG. 1). Alternatively, optionally, the first display device may be a display device that is connected to the first device or that can be controlled by the first device. Based on that no display device is disposed on the first device, for example, the first device is a chip in a handheld terminal or a chip in an in-vehicle terminal, optionally, the first display device may be a display device (for example, a liquid crystal display device or a projection device) that is connected to the first device or that can be controlled by the first device. It should be noted that, for ease of example, in an embodiment of this application, a shape of the screen 131 shown in FIG. 1 is used to represent a shape of the first screen. In embodiments of this application, the shape of the first screen is not limited, and the first device is not limited to the mobile phone 13 shown in FIG. 1.

Optionally, before step A501, the first device may receive the first location information from another device (for example, a terminal). The first device may perform step A501 based on the received first location information. Specifically, for example, display the first location information (that is, text information 21) in the display interface shown in FIG. 2.

In a possible implementation, after the first device displays the first location information on the first screen, a user can read the first location information. In a possible implementation, after reading the first location information, the user can determine that the first location information corresponds to one or more geographic locations. For ease of description, the one or more geographic locations are referred to as a first geographic location. It should be noted that, although an application scene of an embodiment of this application is described in FIG. 1 by using an example in which the user is the driver 11, the user in embodiments of this application is not limited to the driver. For example, the user in an embodiment of this application may alternatively be a passenger in a vehicle.

Figure 6A:
FIG. 6A, FIG. 6B, FIG. 6C, FIG. 7A, FIG. 7B, FIG. 8, FIG. 9, and FIG. 10 separately show several possible display interfaces on a first device.
Figure 6B:
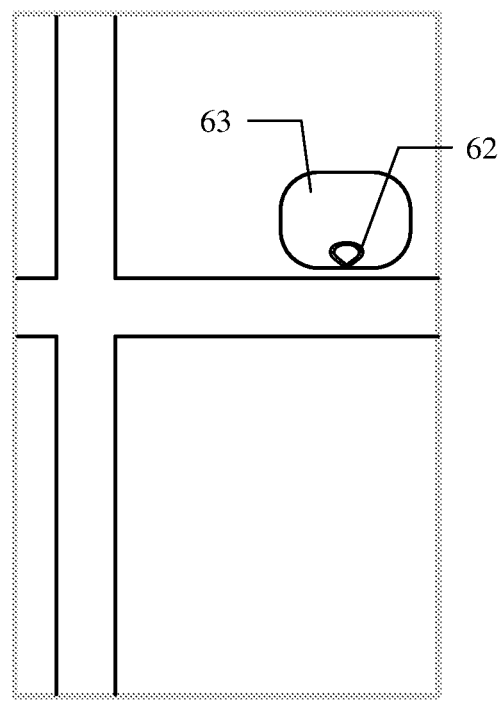
Figure 6C:
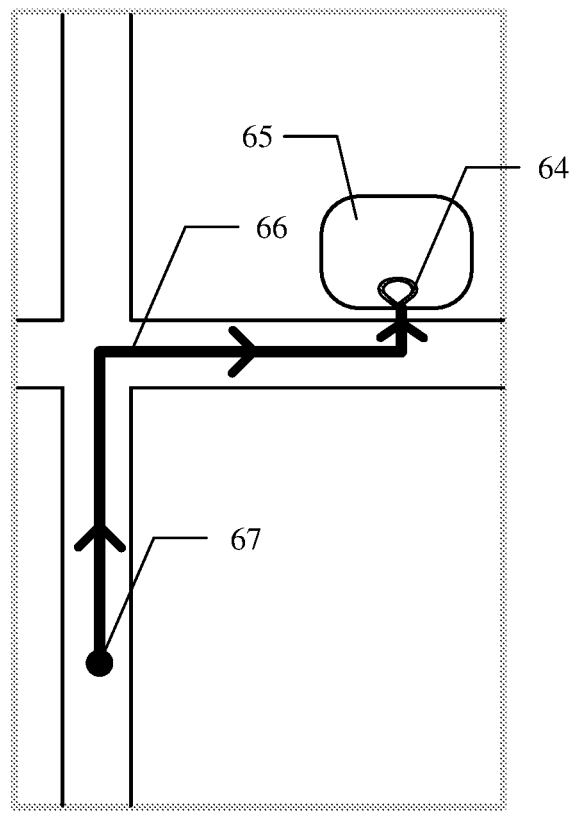
Figure 7A:
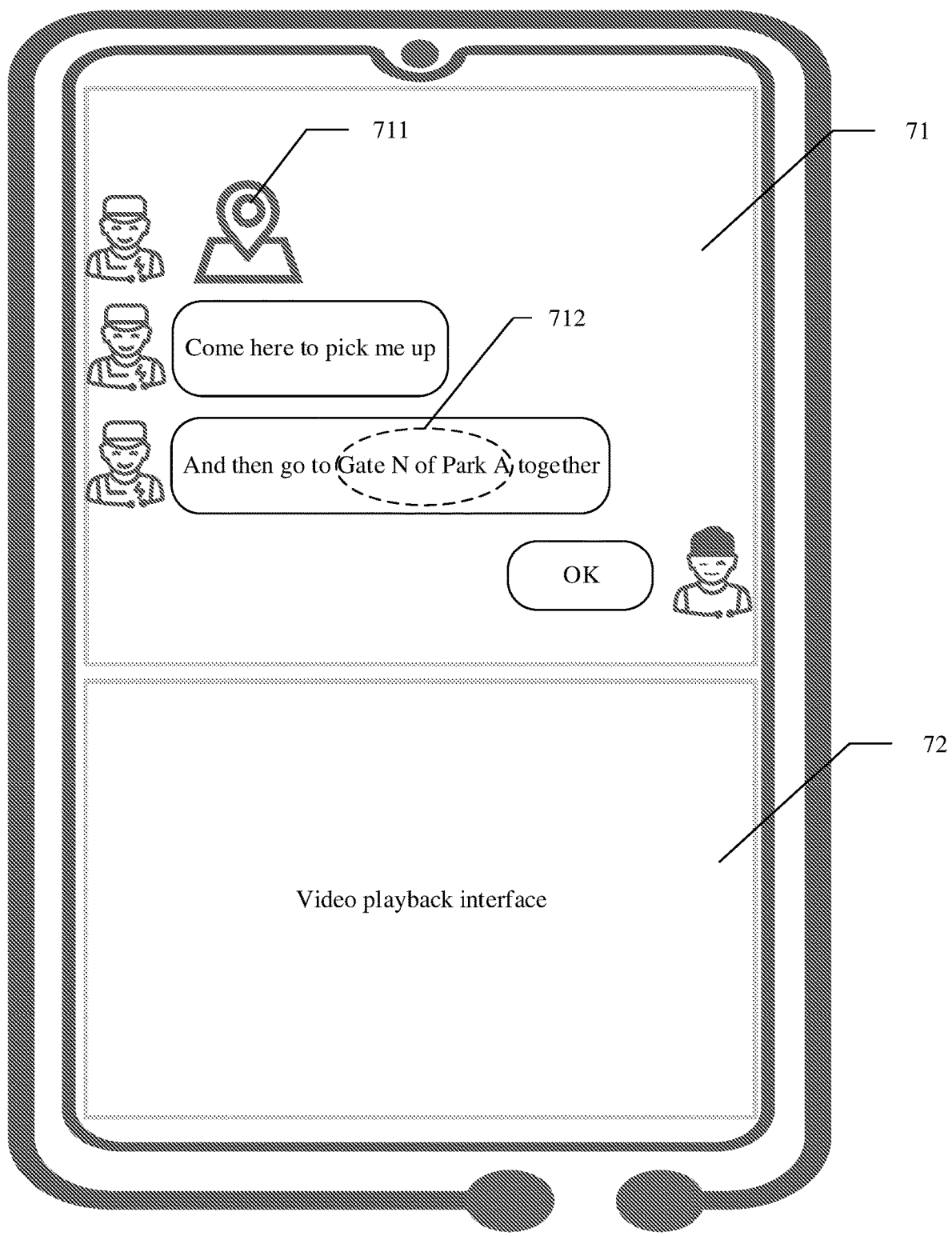
Figure 7B:
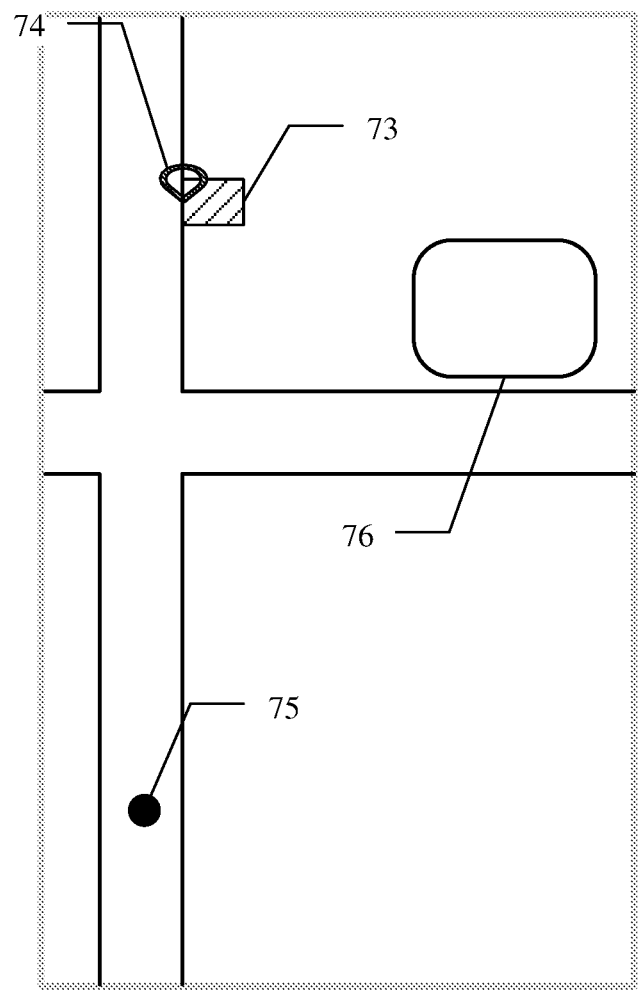
Figure 8:
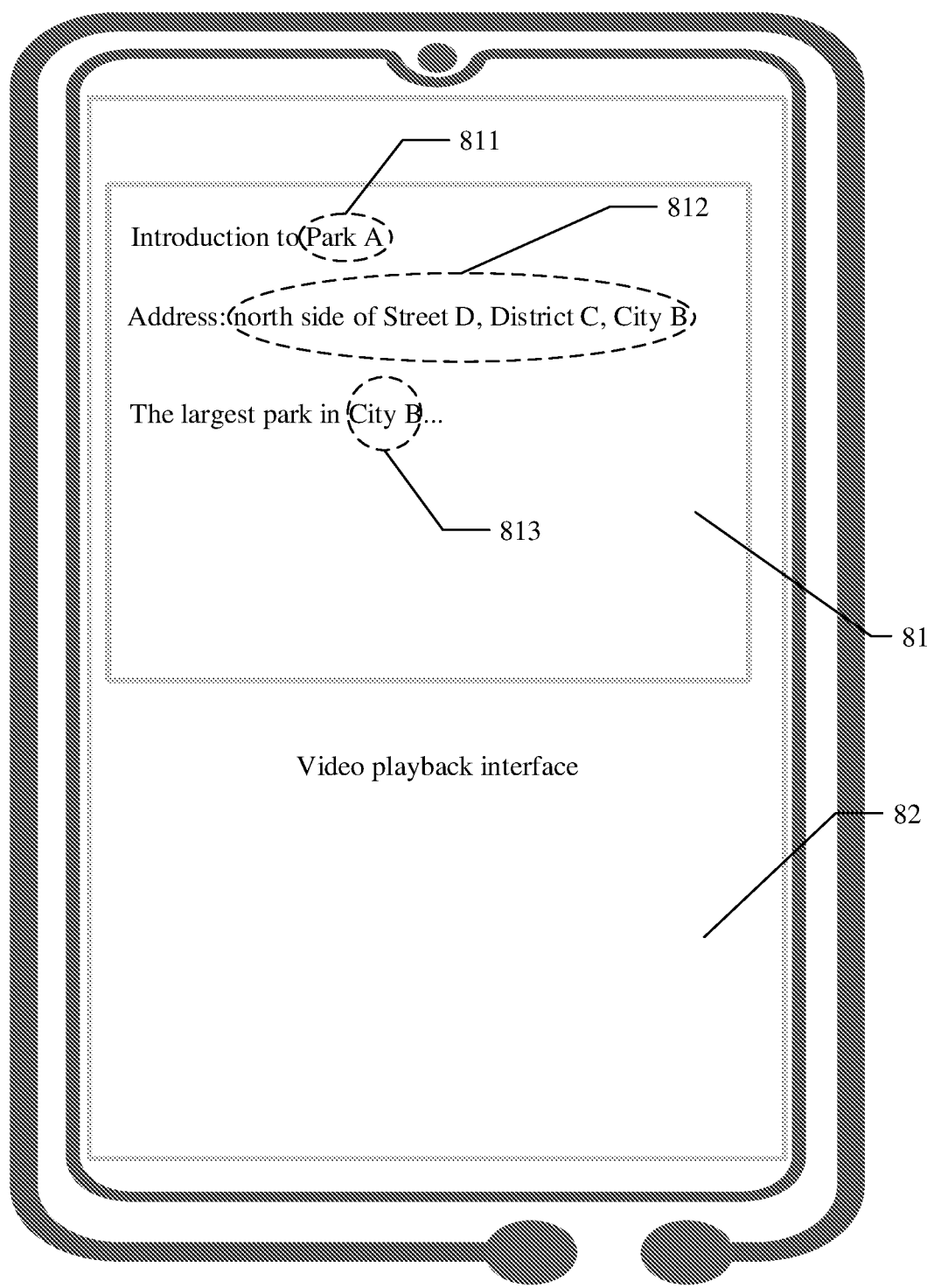

In a possible implementation, for example, the first location information may be any one or more of the following three information types: text information, graphic information on a map, and link information. In a possible implementation, the text information is, for example, the text information 21 shown in FIG. 2, or text information 712 shown in FIG. 7A, or text information 811, text information 812, and text information 813 shown in FIG. 8, or text information 911 shown in FIG. 9, or text information 10021 shown in FIG. 10. In a possible implementation, the graphic information on a map is, for example, a water drop graph 62 (which is assumed to represent a location of Gate N of Park A) on a map shown in FIG. 6B, or a rectangle 65 (which is assumed to represent a location of Park A) on a map shown in FIG. 6C, or a black spot 67 (which is assumed to represent a current location of a user) on a map shown in FIG. 6C, or, for example, a curve segment 66 on the map shown in FIG. 6C (which is assumed to represent a navigation path from the current location to Gate N of Park A). In a possible implementation, a display interface on which the first location information is located is referred to as a first display interface, the link information indicates the first device to display a second display interface, and the second display interface describes the first geographic location. FIG. 6A shows a possible first display interface. The first display interface is, for example, an introduction web page of Park A. The web page includes link information 61. After a user operates the link information 61, optionally, the first device displays a second interface shown in FIG. 6B or FIG. 6C. FIG. 7A shows another possible first display interface. The first display interface is, for example, a chat interface 71. The chat interface 71 includes link information 711. After a user operates the link information 711, optionally, the first device displays a second interface shown in FIG. 7B, and represents a first geographic location by using a water drop graph 74 on a map in FIG. 7B.

It should be noted that the maps in the accompanying drawings in embodiments of this application are merely schematic diagrams, and the map displayed on the first display interface may further include other information, to determine a geographic location represented by a graph on the map. It is assumed that after the user sees a display interface shown in FIG. 4, it can be determined that a rectangle 43 on a map represents Park A, a water drop graph 42 on the map represents Gate N of Park A, a black spot 44 represents a current location of a user, and a curve segment 41 with an arrow represents a navigation path from the current location to Gate N of Park A. It is assumed that after seeing the display interface shown in FIG. 6B, the user can determine that a rectangle 63 on the map represents Park A, and the water drop graph 62 on the map represents Gate N of Park A. It is assumed that after the user sees a display interface shown in FIG. 6C, it can be determined that the rectangle 65 on the map represents Park A, a water drop graph 64 on the map represents Gate N of Park A, the black spot 67 represents a current location of the user, and the curve segment 66 with an arrow represents a navigation path from the current location to Gate N of Park A. It is assumed that after seeing the display interface shown in FIG. 7B, the user can determine that a rectangle 73 on the map represents Supermarket Z, the water drop graph 74 on the map represents an entrance of Supermarket Z, a rectangle 76 represents Park A, and a black spot 75 represents a current location of the user. It is assumed that after seeing a display interface shown in FIG. 12B, a user can determine that a rectangle 1206 on a map represents Park A, a water drop graph 1205 on the map represents Gate N of Park A, and a black spot 1204 represents a current location of the user. It is assumed that after seeing a display interface shown in FIG. 13B, the user can determine that a rectangle 1307 on a map represents Park A, a water drop graph 1303 on the map represents Gate N of Park A, a black spot 1305 represents a current location of the user, a rectangle 1308 represents Supermarket Z, a water drop graph 1304 represents an entrance of Supermarket Z, and a curve segment 1306 with an arrow represents a navigation path from the current location to the entrance of Supermarket Z and then to Gate N of Park A.

In embodiments of this application, it is not limited that the first location information may be only the foregoing information types. In a possible implementation, the first location information may be another information type other than the foregoing three information types.

In a possible implementation, the first device displays a first display interface on a corresponding first screen, where the first display interface includes the first location information. A specific type of the first display interface is not limited in embodiments of this application. In a possible implementation, the first display interface includes a display interface of any one or more of the following four interface types: a web page (for example, the display interface shown in FIG. 6A or a display interface 81 shown in FIG. 8), a chat interface (for example, the display interface shown in FIG. 2 or a display interface 71 shown in FIG. 7A), a map interface (for example, the display interface shown in FIG. 6B, FIG. 6C, FIG. 7B, or FIG. 9 or a display interface 92 shown in FIG. 9), and a notification interface (for example, a display interface 1002 shown in FIG. 10). In a possible implementation, the notification interface is a notification interface displayed on a lock screen interface, a notification interface displayed in a pop-up box (for example, the display interface 1002 shown in FIG. 10), or a notification interface displayed in a drop-down box.

A proportion or a location of the first display interface on the first screen is not limited in embodiments of this application. In a possible implementation, the first display interface is displayed on a split screen of the first screen. Optionally, the first display interface may be, for example, shown in FIG. 7A. The first device displays, for example, a chat interface on the split screen 71 shown in FIG. 7A. Chat content of the chat interface includes first location information 711. The first device displays, for example, a video playback interface on a split screen 72 shown in FIG. 7A. Alternatively, in a possible implementation, the first display interface is displayed in a floating window of the first screen. Optionally, the first display interface may be, for example, shown in FIG. 8. The first device displays, in a floating window 81 shown in FIG. 8, a web page that describes, for example, Park A. The web page includes location information 811, location information 812, and location information 813. The first device displays, for example, a video playback interface on a screen 82 below the floating window 81. Alternatively, the first display interface may be, for example, shown in FIG. 9. The first device displays a chat interface in a floating window 91 shown in FIG. 9, and the chat interface includes first location information 911. Alternatively, in a possible implementation, a floating window is further displayed above the first display interface. Optionally, the first device displays, for example, a navigation interface 92 on a screen below the floating window 91 shown in FIG. 9. Alternatively, in a possible implementation, the first display interface is displayed in a pop-up window of the first screen. Optionally, the first display interface is, for example, shown in FIG. 10. The first device displays, for example, a video playback interface on a home screen 1001 shown in FIG. 10. The first device displays, in a pop-up window 1002, chat information sent by another user other than the user, where the chat information includes first location information 10021.

In a possible implementation, the first location information describes the first geographic location. In a possible implementation, the first geographic location corresponds to one or more geographic locations.

In a possible implementation, one geographic location may be any one of the following three types of geographic locations: a geographic location corresponding to a point, a geographic location corresponding to an area, and a geographic location corresponding to a path. For example, in FIG. 2, it may be considered that the text information 21 describes a geographic location corresponding to a point, or for example, in FIG. 6B, the water drop graph 62 describes a geographic location corresponding to a point, or for example, in FIG. 6A, the link information 61 describes a geographic location corresponding to a point. For example, in FIG. 4, it may be considered that the rectangle 43 describes a geographic location corresponding to an area (an area in which Park A is located), or in FIG. 7B, the rectangle 73 describes a geographic location corresponding to an area (an area in which Supermarket Z is located), or in FIG. 8, the text information 813 describes a geographic location corresponding to an area (an area in which City B is located). For example, in FIG. 4, it may be considered that the curve segment 41 describes a geographic location corresponding to a path. It should be noted that a shape of an area or a path is not limited in embodiments of this application. In a possible implementation, one path is determined by passing, based on a determined sequence, geographic locations corresponding to a plurality of points. For example, arrows on the curve segment 41 shown in FIG. 4 indicates a sequence of geographic locations that the curve segment 41 passes through. In a possible implementation, location information that describes the geographic location corresponding to a path may be navigation information. Alternatively, in a possible implementation, a path does not indicate an explicit start point or end point.

Based on that the first geographic location corresponds to a plurality of geographic locations, in a possible implementation, the first location information may include at least two pieces of location information (which are respectively referred to as location information a and location information b), and the location information a and the location information b respectively describe a geographic location a and a geographic location b.

In a possible implementation, the geographic location a and the geographic location b correspond to geographic locations of a same type, for example, correspond to geographic locations of any one of the foregoing three types. For example, in FIG. 8, the geographic location a and the geographic location b are respectively the text information 811 and the text information 813, and types of geographic locations described by the two geographic locations are both geographic locations corresponding to an area.

Alternatively, in a possible implementation, the geographic location a and the geographic location b correspond to different types of geographic locations, for example, correspond to geographic locations of any two different types in the geographic locations of the foregoing three types. For example, in FIG. 7B, the geographic location a and the geographic location b are respectively the rectangle 73 and the water drop graph 74, and types of geographic locations described by the two geographic locations are respectively a geographic location corresponding to an area and a geographic location corresponding to a point.

In a possible implementation, the location information a and the location information b are location information of a same information type, for example, are any one of the three information types described above. For example, in FIG. 7B, the geographic location a and the geographic location b are respectively the rectangle 73 and the water drop graph 74, and information types of the two geographic locations are graphs on a map.

Alternatively, in a possible implementation, the location information a and the location information b are location information of different information types. For example, the location information a and the location information b are location information of any two different information types in the foregoing three information types. For example, in FIG. 7A, the geographic location a and the geographic location b are respectively the link information 711 and the text information 712, and information types of the two geographic locations are respectively link information and text information.

In a possible implementation, there is a moment at which the first device displays both the location information a and the location information b. Alternatively, in a possible implementation, the first device does not display the location information b in a process of displaying the location information a, and does not display the location information a in a process of displaying the location information b.

In a possible implementation, the location information a and the location information b are located in a same display interface, and the display interface is, for example, a display interface of any one of the foregoing four interface types. For example, the display interface is 71 shown in FIG. 7A, and the link information 711 and the text information 712 are located in the display interface 71.

Figure 9:
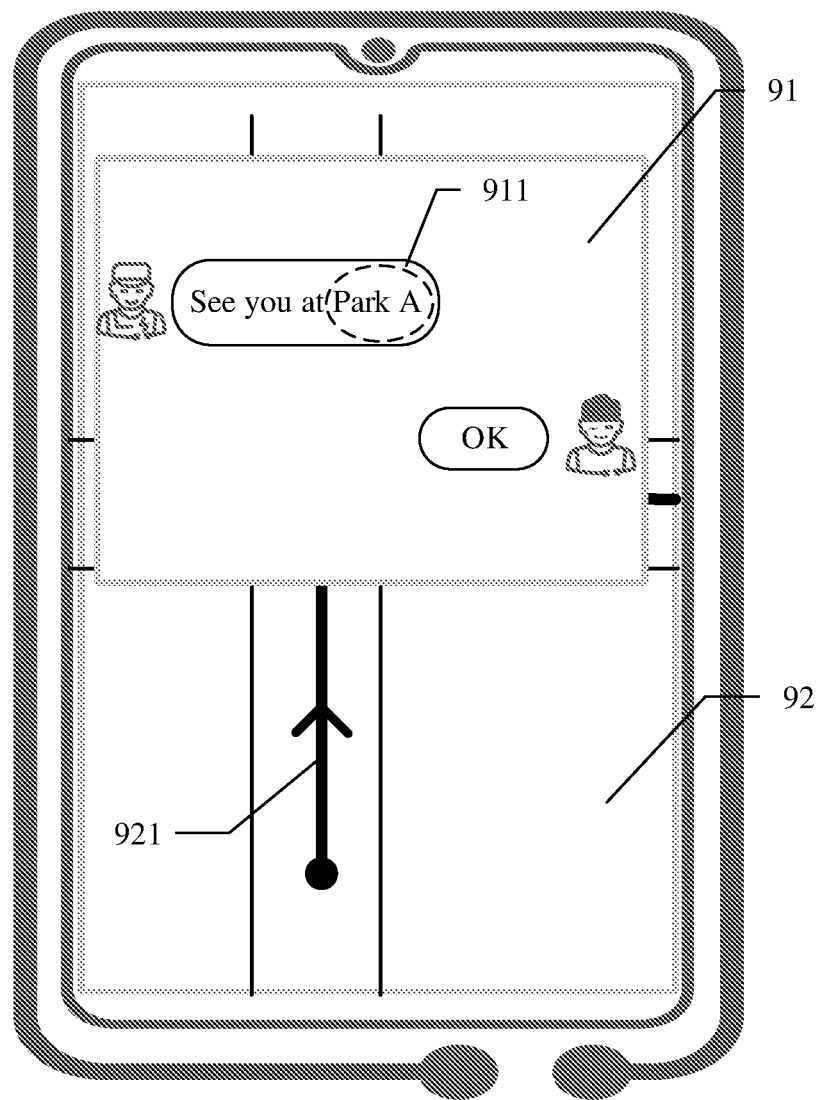
Figure 10:
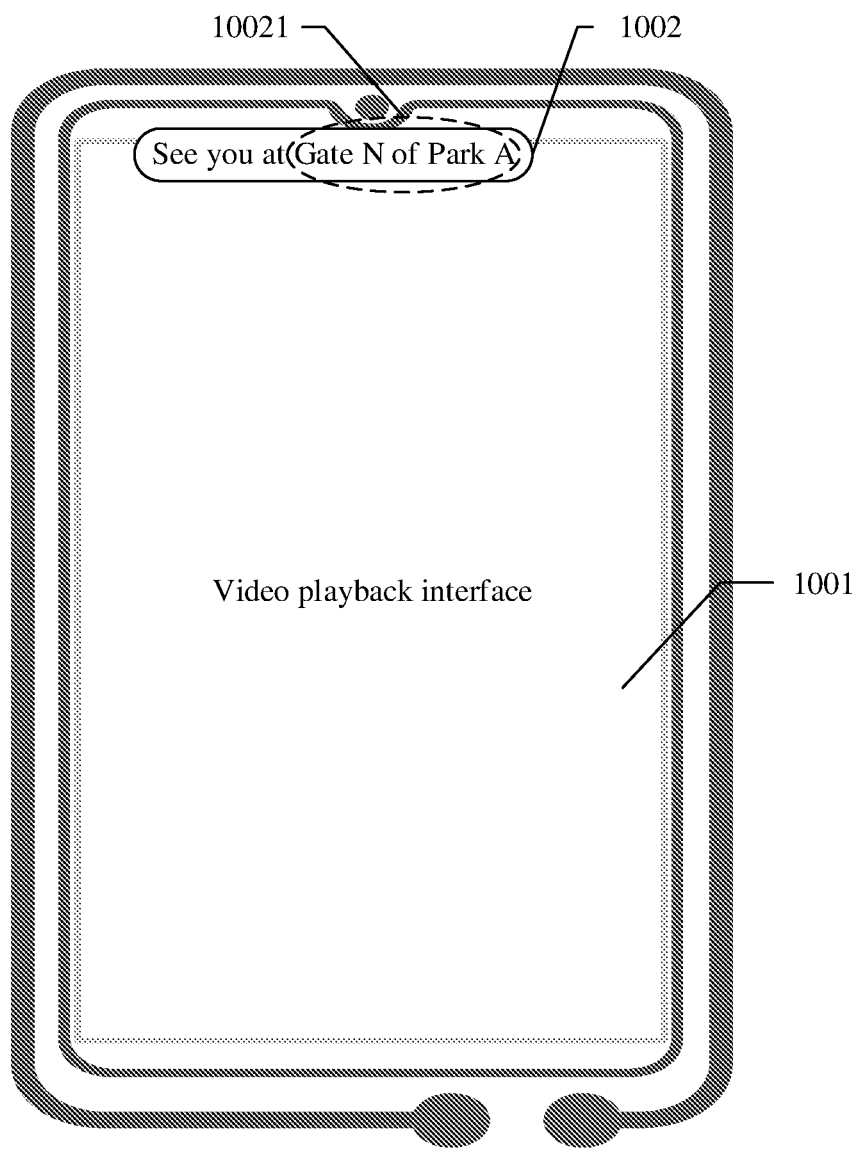

Alternatively, in a possible implementation, the location information a and the location information b are respectively located in different display interfaces. It is assumed that the location information a and the location information b are respectively located in a display interface a and a display interface b of the first screen. In a possible implementation, the display interface a and the display interface b are different display interfaces of a same interface type, and the interface type is, for example, any one of the foregoing four interface types. Alternatively, in a possible implementation, the display interface a and the display interface b are display interfaces of different interface types. For example, the display interface a and the display interface b are display interfaces of any two different interface types in the foregoing four interface types. For example, the first screen is shown in FIG. 9, and the text information 911 and a curve segment 921 are respectively located in a chat interface and a map interface.

A502: The first device sends a first message to a second device.

After displaying the first location information, the first device may send the first message to the second device.

In a possible implementation, the second device is one or more devices that establish a communication connection to the first device.

In a possible implementation, the first device sends the first message to the second device through a second communication connection. In a possible implementation, the second communication connection may be a communication connection established based on a wireless communication technology. For example, optionally, the wireless communication technology may be any one or more of a Bluetooth technology, a near field communication (near field communication, NFC) technology, a wireless fidelity (wireless fidelity, Wi-Fi) technology, and a mobile communication technology. Alternatively, in a possible implementation, the second communication connection may be a wired communication connection. For example, optionally, the second communication connection transmits a signal through a tangible medium like a metal cable or an optical fiber.

In a possible implementation, the first message is obtained through encapsulation according to a first communication protocol. Optionally, the first communication protocol corresponds to a communication protocol of the second communication connection. For example, if the second communication connection is a Bluetooth technology-based communication connection, the first communication protocol may be a Bluetooth protocol. For example, if the second communication connection is an NFC technology-based communication connection, the first communication protocol may be an NFC protocol.

In a possible implementation, the first message indicates the second device to output location information related to the first location information. It should be noted that, in embodiments of this application, it is not limited that the second device outputs, based on the first message, only the location information related to the first location information, and the second device may further output other information. In addition, in embodiments of this application, it is not limited that the second device outputs, based on the first message, only one piece of location information related to the first location information. In a possible implementation, the first message may indicate the second device to output a plurality of pieces of location information related to the first location information.

The following uses one piece of location information (that is, corresponding to one geographic location) related to the first location information as an example for description. If the first message indicates the second device to output a plurality of pieces of location information related to the first location information, in a possible implementation, for understanding of each piece of location information, refer to the following description.

Based on that the first message indicates the second device to output the location information related to the first location information, in a possible implementation, the location information related to the first location information is information that can be displayed by the second device. Correspondingly, the first message indicates the second device to display the location information related to the first location information on a corresponding second screen.

The second screen is a screen of a second display device. Based on that a display device (for example, a liquid crystal display device or a projection device) is disposed on the second device, optionally, the second display device may be a display device of the second device, and the second screen is a screen of the second device (for example, a screen of the head unit 14 shown in FIG. 1). Alternatively, optionally, the second display device may be a display device that is connected to the second device or that can be controlled by the second device. Based on that no display device is disposed on the second device, for example, the second device is a chip in a handheld terminal or a chip in an in-vehicle terminal, optionally, the second display device may be a display device (for example, a liquid crystal display device or a projection device) that is connected to the second device or that can be controlled by the second device. It should be noted that, for ease of example, in an embodiment of this application, a shape of the screen of the head unit 14 shown in FIG. 1 is used to represent a shape of the second screen. A shape of the second screen is not limited in embodiments of this application, and the second device is not limited to the head unit 14 shown in FIG. 1.

In a possible implementation, that the location information is related to the first location information means that the location information is the same as the first location information. For a description of the first location information, refer to related content in step A501. Details are not described herein again.

Alternatively, in a possible implementation, that the location information is related to the first location information means that the location information is different from the first location information, but the location information is used to describe a second geographic location, and the second geographic location is related to the first geographic location.

In a possible implementation, that the second geographic location is related to the first geographic location means that the second geographic location and the first geographic location include a same geographic location. For example, the second geographic location and the first geographic location include at least one geographic location corresponding to a same point.

Based on that the first geographic location corresponds to one geographic location, in a possible implementation, that the second geographic location and the first geographic location include a same geographic location means that the second geographic location is the same as the first geographic location. In a possible implementation, an information type of the location information is different from an information type of the first location information, and optionally, are respectively any two different information types of the foregoing three information types. For example, the first location information and the location information related to the first location information are respectively the text information 21 shown in FIG. 2 and the water drop graph 42 on the map shown in FIG. 4. Alternatively, in a possible implementation, an information type of the location information is the same as an information type of the first location information, for example, is any one of the foregoing three information types, but content of the location information is different from content of the first location information. For example, the first location information and the location information related to the first location information are respectively the text information 21 shown in FIG. 2 and text information 1302 shown in FIG. 13A. Although both are text information, content of the first location information and the location information related to the first location information are different. Although the content is different, the user can determine that geographic locations described by the text information 21 and the text information 1302 are the same.

Alternatively, in a possible implementation, that the second geographic location and the first geographic location include a same geographic location means that the second geographic location is different from the first geographic location, and the second geographic location includes the first geographic location. Optionally, the second geographic location is an area or a path, and the first geographic location is a point. It is assumed that the first location information is, for example, the text information 21 shown in FIG. 2, and the location information related to the first location information is, for example, an area 43 in a rectangle (describing a geographic location corresponding to an area) shown in FIG. 4 or the curve segment 41 (describing a geographic location corresponding to a path) shown in FIG. 4.

Alternatively, in a possible implementation, that the second geographic location and the first geographic location include a same geographic location means that the second geographic location is different from the first geographic location, and the first geographic location includes the second geographic location.

Based on that the first geographic location includes the second geographic location, optionally, the first geographic location is an area or a path, and the second geographic location is a point. For example, the first location information is the text information 911 (describing a geographic location corresponding to an area) shown in FIG. 9, and the second location information is text information 1201 (describing a geographic location corresponding to a point) shown in FIG. 12A. In a possible implementation, an information type of the location information related to the first location information is different from an information type of the first location information. Alternatively, in a possible implementation, an information type of the location information related to the first location information is the same as an information type of the first location information. For an information type of the location information, refer to the foregoing related descriptions. Details are not described herein again.

Figure 12A:
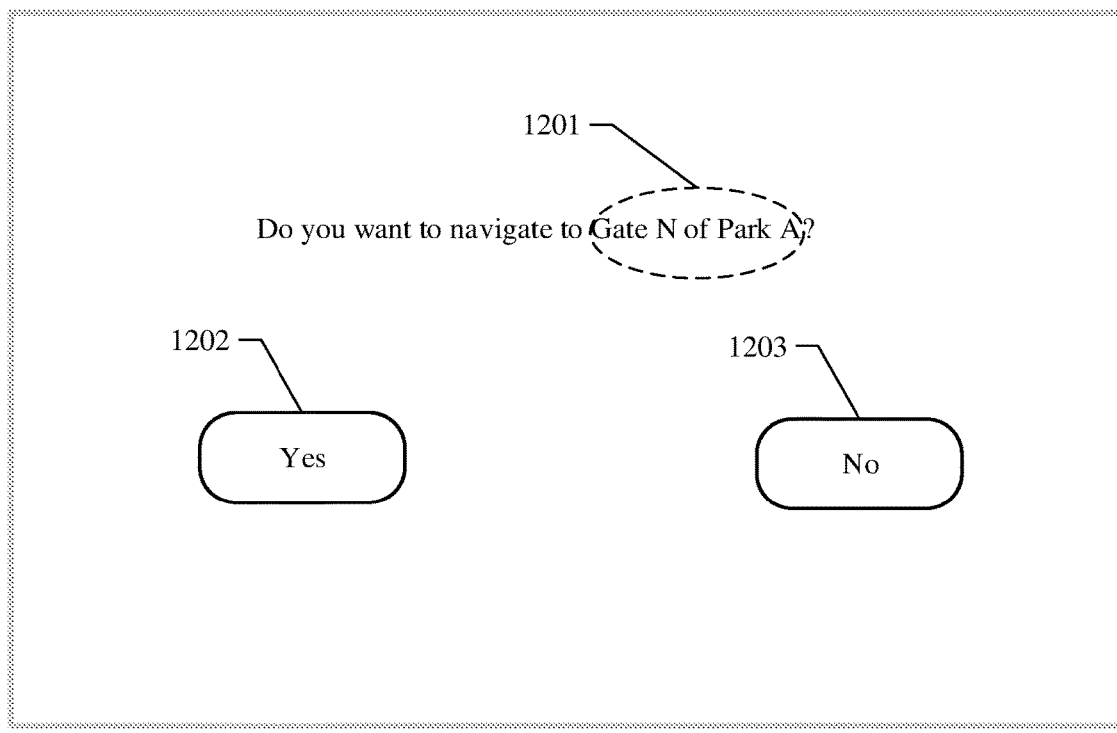
FIG. 12A, FIG. 12B, FIG. 13A, and FIG. 13B separately show several possible display interfaces on a second device.
Figure 12B:
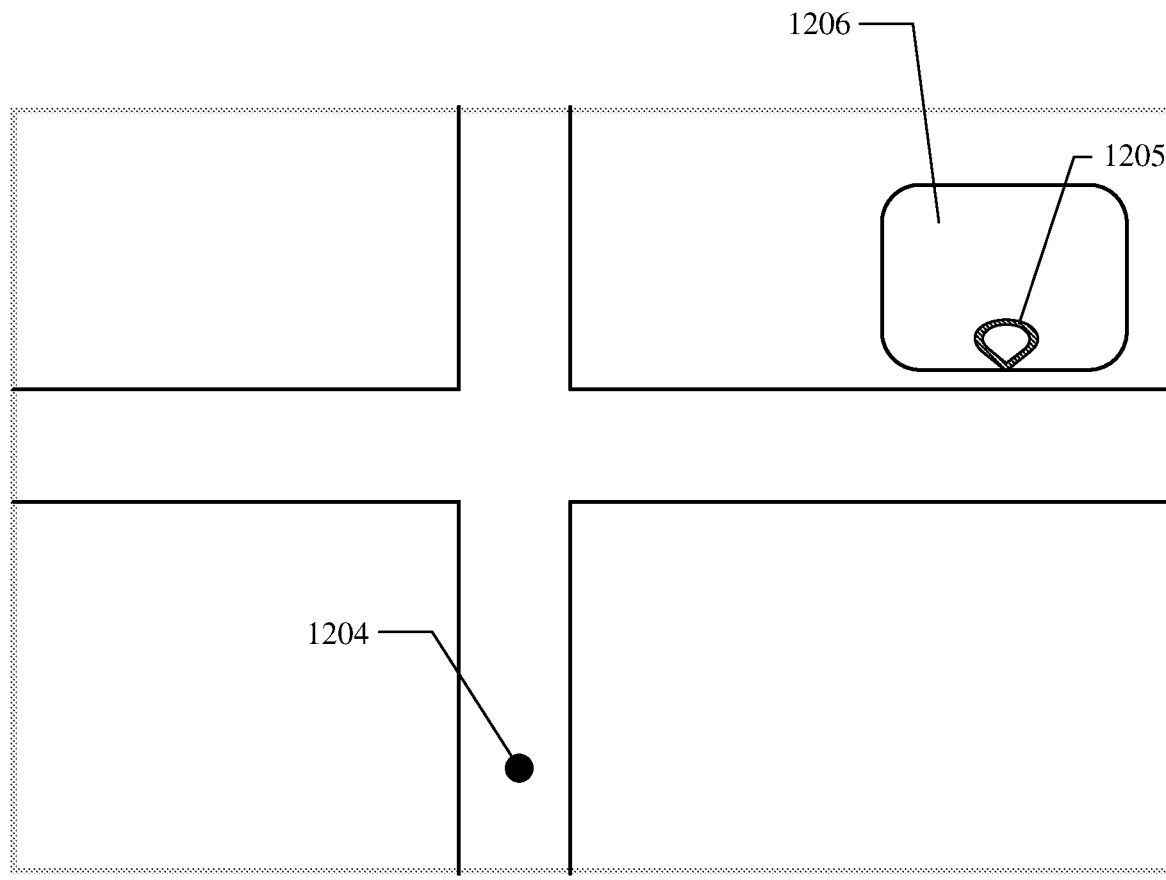
Figure 13A:
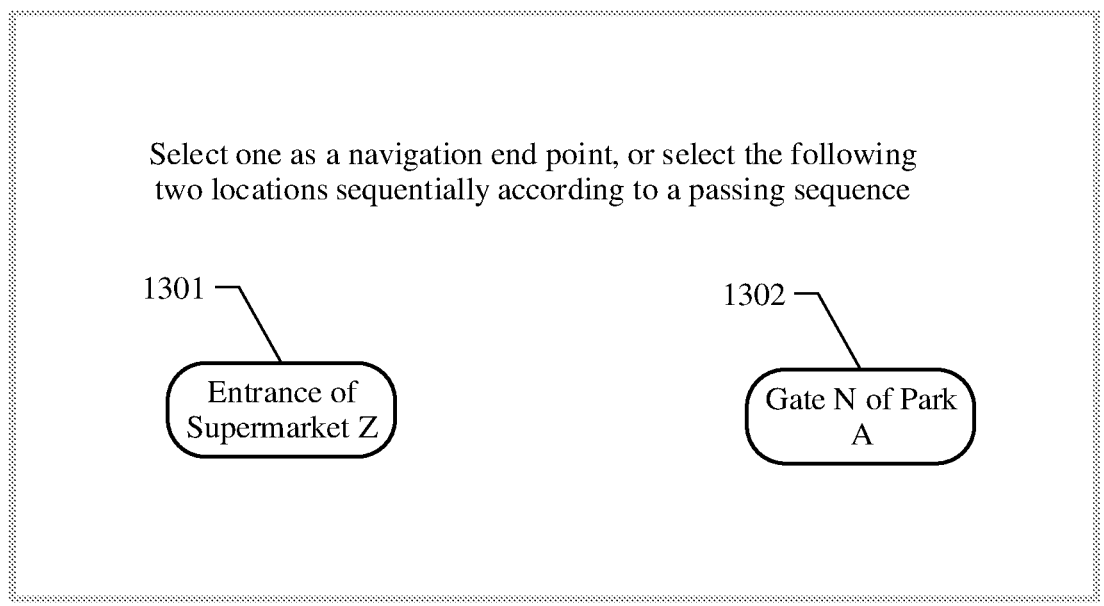
Figure 13B:
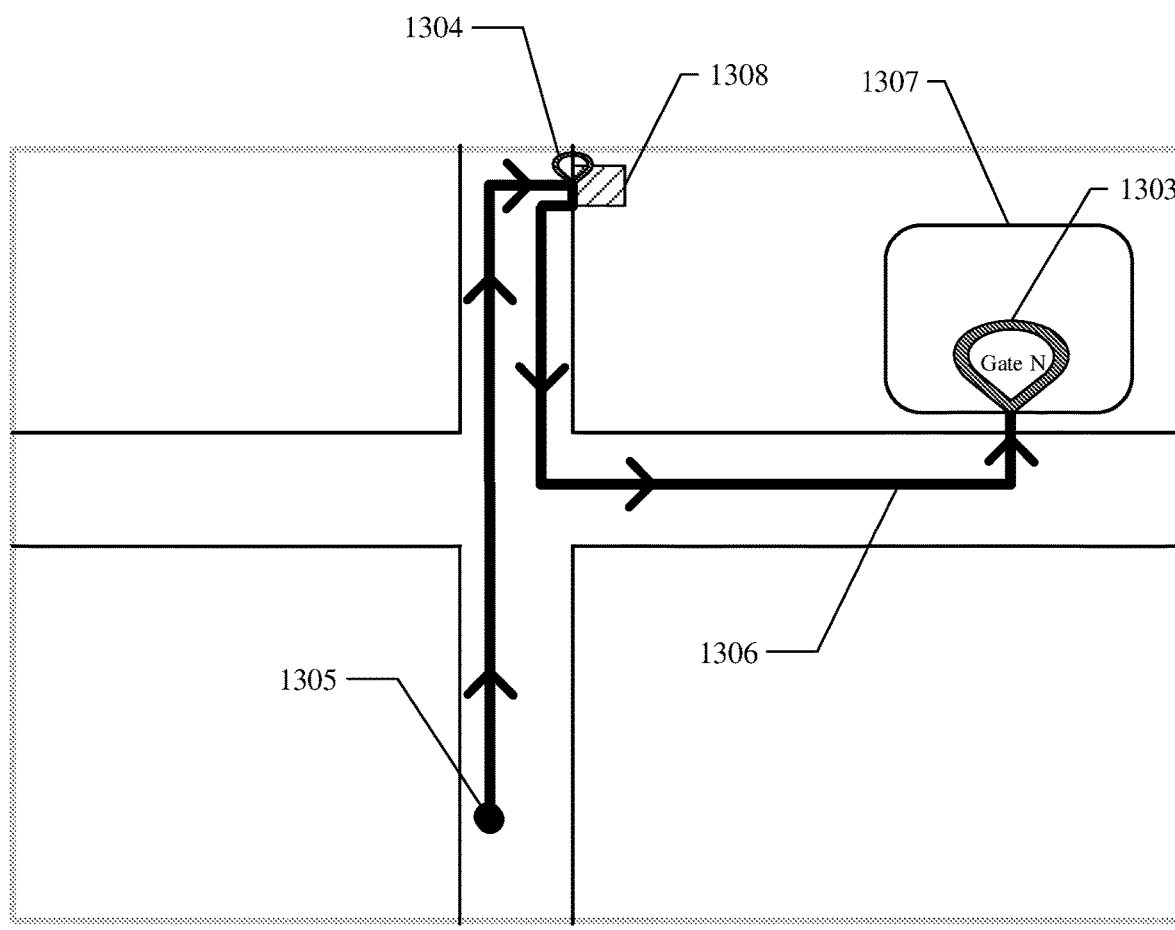

For example, it is assumed that the first display interface is shown in FIG. 7A, the first display interface includes the link information 711 and the text information 712, and the location information related to the first location information may be text information 1201 shown in FIG. 12A, or text information 1302 shown in FIG. 13A. Alternatively, for example, it is assumed that the first display interface is shown in FIG. 7A, the first display interface includes link information 711 and text information 712, and the location information related to the first location information may be the rectangle 43, the water drop graph 42, or the curve segment 41 on the map shown in FIG. 4, or the curve segment 1306, the water drop graph 1303, the water drop graph 1304, or the rectangle 1307, or the rectangle 1308 shown in FIG. 13B.

Based on that the first geographic location includes the second geographic location, optionally, the first geographic location corresponds to a plurality of geographic locations, and the first message carries location information of at least two of the plurality of geographic locations.

In a possible implementation, the second device automatically selects one geographic location from the at least two geographic locations as a passing location or an end location of a navigation path (referred to as a first path), and then outputs corresponding navigation information. Alternatively, optionally, the second device selects, under an instruction of the user, one geographic location from the at least two geographic locations as a passing location or an end location of a navigation path (referred to as a first path), and then outputs corresponding navigation information.

In a possible implementation, the first message further carries a sequence (referred to as a first sequence) between the at least two geographic locations, and the second device determines a navigation path (referred to as a first path) based on the first sequence, and then outputs corresponding navigation information. In a possible implementation, the first sequence is determined by the second device based on text information of a display sequence or a description sequence of the location information of the at least two geographic locations on the first display interface. For example, refer to FIG. 7A. The first device may determine, based on a display sequence of the link information 711 and the text information 712 in the display interface 71 or text information "after", that a geographic location described by the link information 711 is before a geographic location described by the text information 712, and further display the curve segment 1306 shown in FIG. 13B.

In a possible implementation, the second device determines, automatically or according to an instruction of a user, a sequence between the at least two geographic locations, and then determines a navigation path (referred to as a first path) based on the sequence, and outputs corresponding navigation information. For example, refer to FIG. 13A. The first message carries text information 1301 and the text information 1302. After receiving the first message, the second device prompts the user to specify a sequence between a geographic location corresponding to the text information 1301 and a geographic location corresponding to the text information 1302. For example, the user first selects the text information 1301, and then selects the text information 1302. After detecting a selection operation of the user, the second device may display a path 1306 shown in FIG. 13B.

Figure 4:
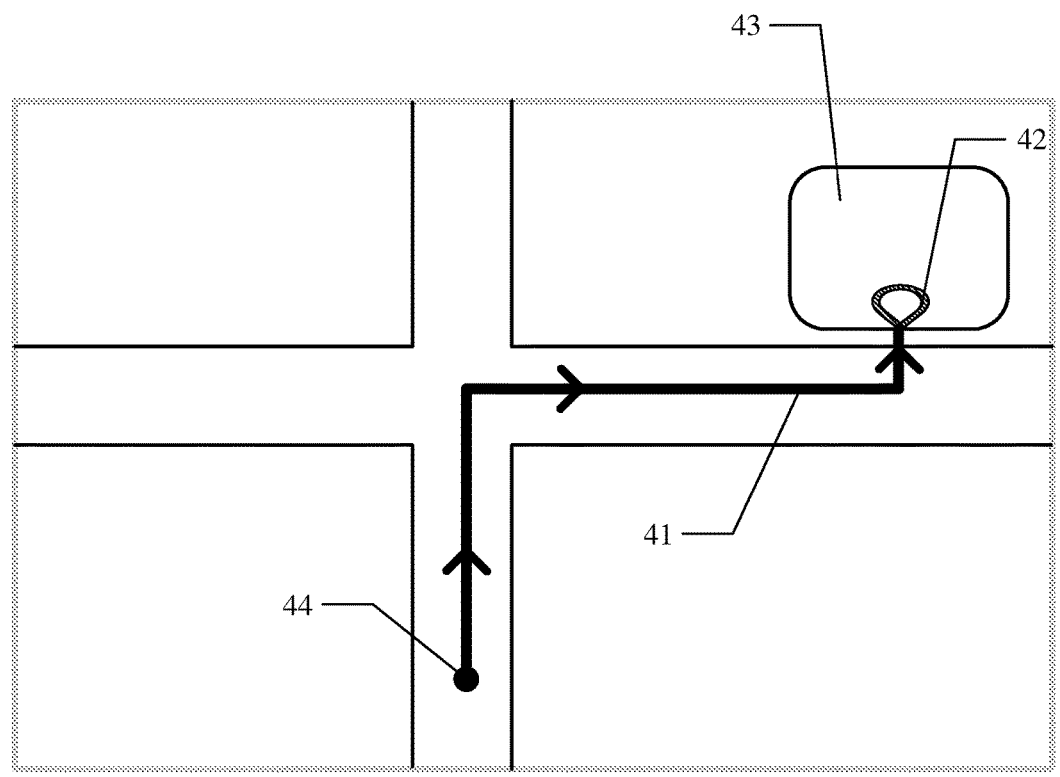
FIG. 4 shows a possible display interface of a head unit 14.

The foregoing describes several possible cases in which the second geographic location and the first geographic location include a same geographic location. Based on that the first message indicates the second device to output navigation information related to the first location information, a path described by the navigation information is referred to as the first path. In a possible implementation, before receiving the first message, the second device may output navigation information that describes a second path. For example, a display interface that is of the second device before receiving the first message is shown in FIG. 4, and the second path is a path 41 in FIG. 4. Optionally, after receiving the first message, the second device may use, automatically or according to an instruction of the user, an end location of the second path as an end location of the first path, use the same geographic location as a passing location of the first path, and output navigation information that describes the first path. It is assumed that the foregoing same geographic location corresponds to a geographic location indicated by the water drop graph 74 in FIG. 7B, and the first path determined by the second device based on the first message and the second path may be, for example, the path 1306 shown in FIG. 13B. Alternatively, optionally, after receiving the first message, the second device may determine the end location of the first path automatically or according to an instruction of the user and based on the same geographic location, and output navigation information that describes the first path. For example, the end location that is of the first path and that is determined by the second device corresponds to a geographic location indicated by the water drop graph 1304 in FIG. 13B. In a possible implementation, the first path may further use the end location of the second path as a passing location. For example, the first path may first pass through the geographic location indicated by the water drop graph 1303 in FIG. 13B, and then reach the geographic location indicated by the water drop graph 1304 in FIG. 13B.

In a possible implementation, based on that the second device outputs the second location information related to the first location information, in a possible implementation, the second device may send a response message to the first device. Based on that the first display interface on which the first location information is located is a chat interface, after receiving the response message, the first device may input response information for the first location information in an input box of the chat interface, to indicate that the user agrees to go to the first geographic location described by the first location information. For example, content of the response information may be "OK", "no problem", "see you later", or the like. After inputting the response information in the input box of the chat interface, the first device may send, automatically or according to an instruction of the user, the answer information. This helps further simplify a user operation.

Based on that the first message indicates the second device to output the location information related to the first location information, in a possible implementation, the location information related to the first location information is audio information. Correspondingly, the first message indicates the second device to play the location information by using an audio device.

In a possible implementation, that the location information is related to the first location information means that content corresponding to the location information is the same as content corresponding to the first location information. Optionally, an information type of the first location information is text information, for example, "Gate N of Park A" shown in FIG. 2. Content of the audio information played by the second device based on the first message includes content corresponding to the text information. For example, the content of the played audio information is "whether to navigate to Gate N of Park A", and the text content corresponding to the location information related to the first location information is "Gate N of Park A".

Alternatively, in a possible implementation, that the location information is related to the first location information means that the location information is used to describe the second geographic location, and the second geographic location is related to the first geographic location. For a description of the second geographic location related to the first geographic location, refer to the foregoing related content. Details are not described herein again.

The first device performs step A501 and step A502, which helps implement that after the first device displays the first location information, the second device can output the location information related to the first location information without a need for a user to manually enter the location information to the second device, thereby simplifying a user operation.

In a possible implementation, the first message carries first information. In a possible implementation, that the first message carries first information means that information obtained by decapsulating the first message according to the first communication protocol includes the first information.

In a possible implementation, the first information is used to determine the foregoing first location information. Optionally, the second device may determine the first location information based on the first information, and further determine and output the location information related to the first location information.

Alternatively, in a possible implementation, the first information is used to determine the foregoing location information related to the first location information. Optionally, the second device may determine and output, based on the first information, the location information related to the first location information.

Alternatively, in a possible implementation, the first information is used to determine the foregoing first geographic location. Optionally, the first information is used to locate the first geographic location. For example, the first information is longitude and latitude information, address information, or navigation information. In a possible implementation, the address information is information that is determined based on road surface planning and that is used to locate the first geographic location. For example, address information of Park A is an intersection of a street in a city of a country. In a possible implementation, the navigation information indicates a navigation APP to determine a first geographic location on a map.

Alternatively, in a possible implementation, the first information is used to determine the foregoing second geographic location. Optionally, the first information is used to locate the second geographic location. For example, the first information is longitude and latitude information, address information, or navigation information. For an explanation of the address information or the navigation information, refer to the foregoing corresponding content. Details are not described herein again.

In a possible implementation, after the first device displays the first location information, and before the first device sends the first message to the second device, the first device may further obtain the first information.

In a possible implementation, the first information is generated by an APP corresponding to the first display interface. The first device can obtain first information generated by the APP corresponding to the first display interface, generate, based on the first information, a first message, and send the first message to the second device. In a possible implementation, the APP corresponding to the first display interface is a third-party APP installed on the first device. Optionally, the third-party APP provides an interface for a system APP of the first device, and sends the first information to the system APP of the first device after the first information is generated.

Alternatively, in a possible implementation, the first information is generated by the first device by identifying displayed content. In a possible implementation, the first device obtains a screenshot image, identifies first location information in the screenshot image, and then generates first information based on an identification result. After obtaining the first information, the first device may generate a first message based on the first information, and send the first message to the second device.

In a possible implementation, the first information is obtained through encapsulation according to a first data protocol. In a possible implementation, the first data protocol is an application layer protocol. In a possible implementation, the first data protocol is a protocol supported by a first APP. In a possible implementation, the first APP corresponds to one APP. For example, the first APP is an APP corresponding to the first display interface. Alternatively, in a possible implementation, the first APP corresponds to a plurality of APPs. For example, the first APP corresponds to an APP corresponding to the first display interface, and further corresponds to another APP other than the APP corresponding to the first display interface.

In a possible implementation, the first message further carries a first identifier. In a possible implementation, that the first message carries the first identifier means that information obtained by decapsulating the first message according to the first communication protocol further includes the first identifier. In a possible implementation, the first identifier is used to determine a first data format or used to determine one or more APPs corresponding to the first APP. The first identifier helps indicate the second device to search for an APP that supports the first data format, and further helps the second device parse the first information by using the found APP. After parsing the first information, the second device determines, based on a parsing result of the first information, third location information related to the first location information, and outputs, based on the third location information, the second location information related to the first location information.

The foregoing describes step A502, and the following describes several possible trigger events in step A502.

Step A502 is performed to send the first message to the second device through the first communication connection. In a possible implementation, based on that the first device prepares a device resource/device resources (for example, sufficient power, sufficient computing resources, sufficient storage resources, or an established first communication connection between the first device and the second device) and a software resource/software resources (for example, a system APP does not disable a function corresponding to the method in an embodiment of this application, or a function corresponding to the method in an embodiment of this application is enabled) that are used to send the first message, as long as the first device meets the trigger event of step A502, the first device may perform step A502.

In a possible implementation, the trigger event of step A502 includes only step A501. For example, provided that the first device displays the first location information, the first device sends the first message to the second device.

However, after the first device displays the first location information, the user may not need the first device to send the first message to the second device. In this way, device resources (for example, computing resources and network resources) of the first device and the second device are easily wasted.

In a possible implementation, in addition to step A501, the trigger event of step A502 may further include another event. When the trigger event of step A502 includes a plurality of events, that the first device satisfies the trigger event of step A502 means that the first device satisfies all events in the trigger event of step A502. In a possible implementation, the method in an embodiment of this application further includes step A503, and the another event further includes step A503.

A503: The first device obtains establishment information of a first communication connection.

In a possible implementation, the first communication connection is a connection established based on a short-range wireless communication technology. For example, in a possible implementation, the short-range wireless communication technology is a near field communication (near field communication, NFC) technology. Alternatively, in a possible implementation, the short-range wireless communication technology is a Bluetooth (bluetooth) technology.

The establishment information indicates the first device to establish the first communication connection. In a possible implementation, the first communication connection is a communication connection between the first device and the third device.

Figure 11A:
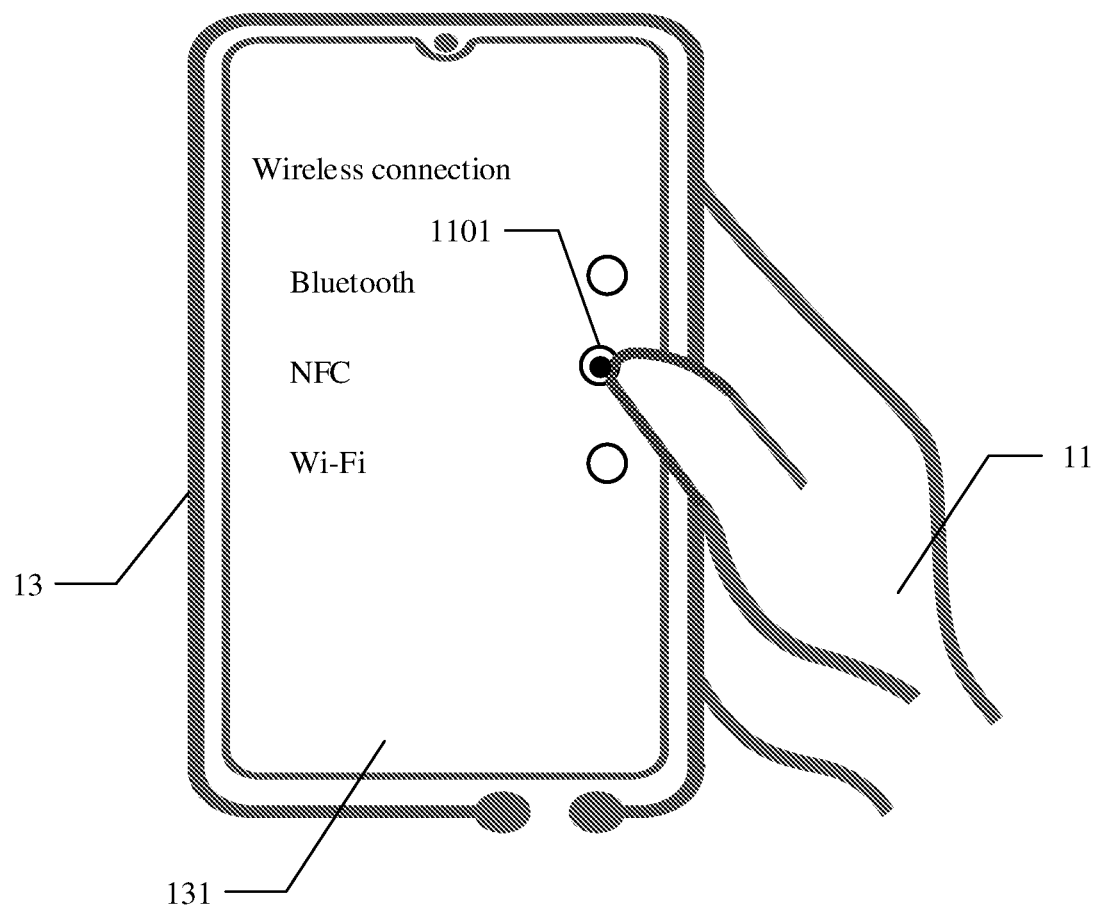
FIG. 11A, FIG. 11B, and FIG. 11C separately show possible scenes after the scene shown in FIG. 1.
Figure 11B:
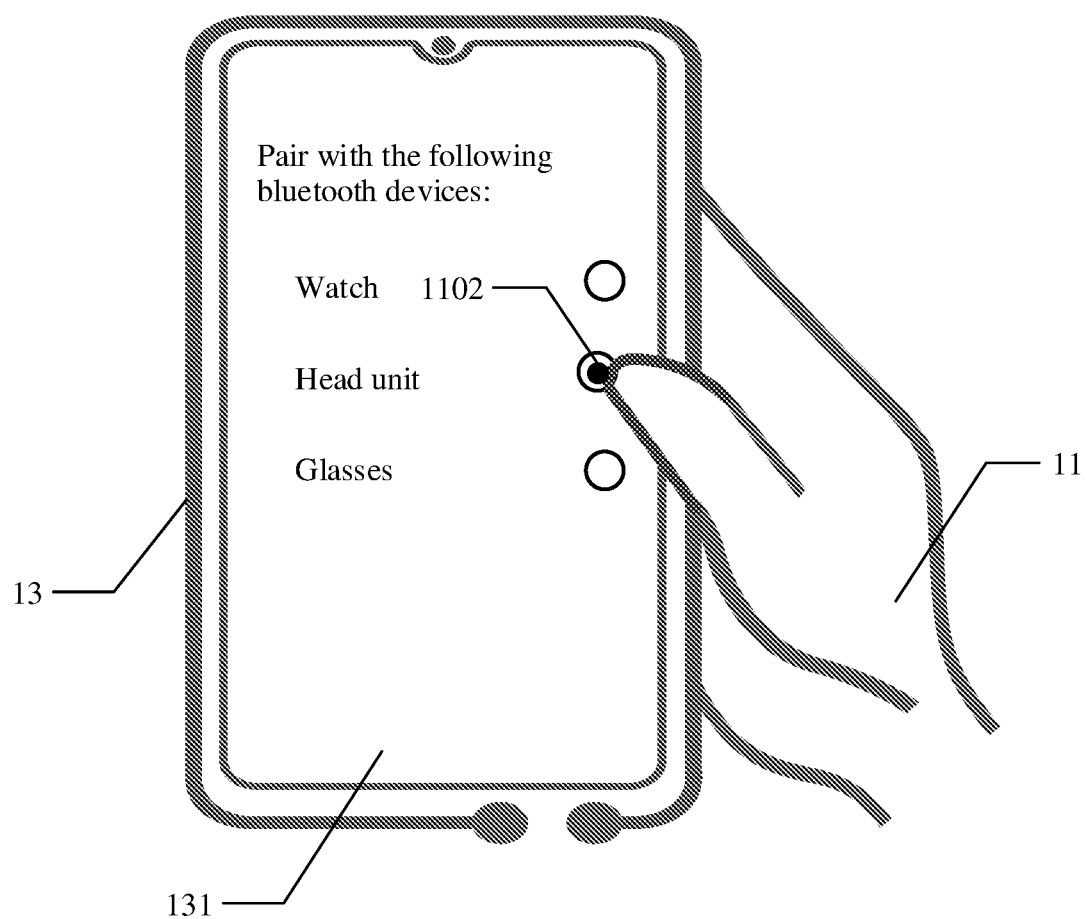

In a possible implementation, the establishment information may be first operation information that is of the user and that is detected by the first device. In a possible implementation, the first operation information indicates the first device to enable a function or an interface corresponding to the first communication connection. For example, refer to FIG. 11A. The mobile phone 13 displays a wireless connection setting interface on the screen 131. When a user 11 selects an option 1101 corresponding to "NFC", the first device can detect operation information of the user 11, and the operation information indicates the first device to enable an NFC function of the mobile phone 13, for example, control an NFC communication module to enable a radio frequency field. Alternatively, in a possible implementation, the first operation information indicates the first device to initiate a procedure for establishing the first communication connection, for example, indicate the first device to send a request for establishing the first communication connection to the third device. For example, referring to FIG. 11B, the mobile phone 13 displays a Bluetooth setting interface on the screen 131. When the user 11 selects an option 1102 corresponding to the "head unit", the first device can detect operation information of the user 11, and the operation information indicates the mobile phone 13 to send a request for establishing a Bluetooth connection to the head unit 14. Alternatively, in a possible implementation, the first operation information indicates that the first device accepts the request for establishing the first communication connection from the third device.

Figure 11C:
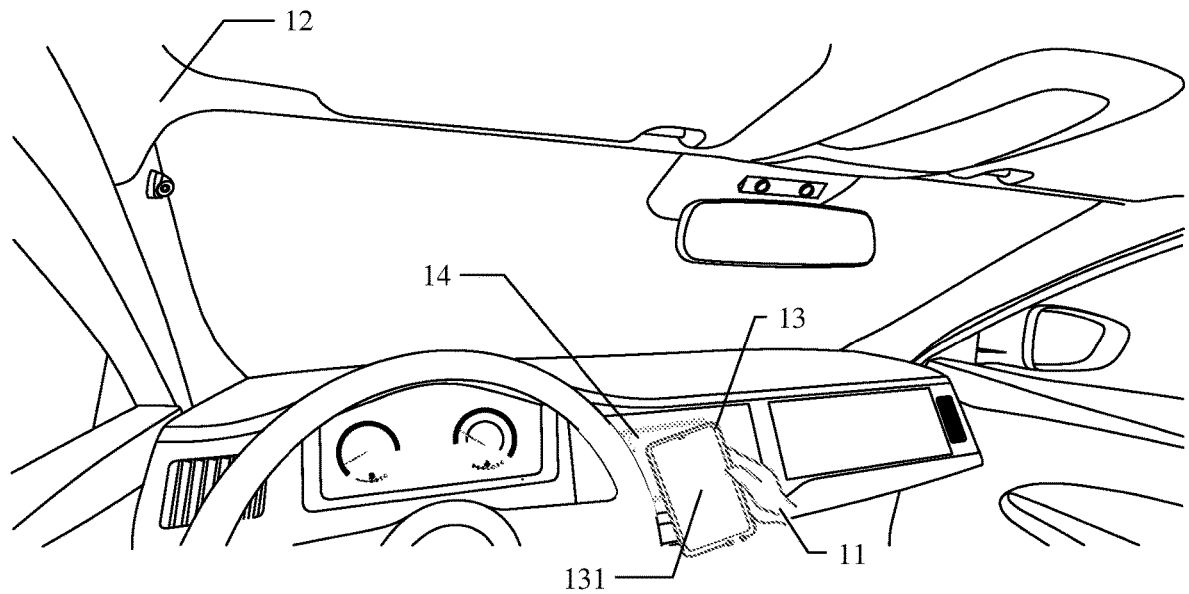

In a possible implementation, the establishment information is information from the third device. In a possible implementation, the establishment information requests the first device to establish the first communication connection to the third device. Alternatively, in a possible implementation, the establishment information is used to respond to a request that is for establishing the first communication connection and that is sent by the first device to the third device. For example, the first communication connection is a communication connection in an NFC technology. In a possible implementation, after the first device displays the first information, the user may hold the mobile phone 13 to approach the head unit 14, as shown in FIG. 11C. In a possible implementation, that the mobile phone 13 and the head unit 14 are respectively a first device and a third device is used as an example. NFC functions of both the mobile phone 13 and the head unit 14 are enabled, and the mobile phone 13 may receive an NFC establishment request or a response to the NFC establishment request from the head unit 14. In a possible implementation, for example, the mobile phone 13 and the head unit 14 are respectively a third device and a first device. NFC functions of both the mobile phone 13 and the head unit 14 are enabled, and the head unit 14 may receive an NFC establishment request or a response to the NFC establishment request from the mobile phone 13.

In a possible implementation, before the first device receives the establishment information, the first communication connection is not established between the first device and the third device. In a possible implementation, after receiving the establishment information, the first device may establish the first communication connection to the third device. Alternatively, in a possible implementation, after receiving the establishment information, the first device may not establish the first communication connection to the third device.

In a possible implementation, the first communication connection is a communication connection between the first device and the third device. In a possible implementation, the establishment information can be used to determine a device identifier of the third device. For example, optionally, the establishment information carries a device identifier of the third device.

In a possible implementation, the first device presets one or more device identifiers, and the third device corresponds to one of the one or more device identifiers. An example in which the first communication connection is NFC is used. It is assumed that the one or more device identifiers correspond to, for example, the head unit shown in FIG. 1, and do not correspond to a smartwatch of the user. If the first device displays first location information, and receives establishment information of an NFC connection between the first device and the head unit, in a possible implementation, the first device may perform step A502 of sending the first message to the head unit. If the first device displays first location information, and receives establishment information of an NFC connection between the first device and the smartwatch, in a possible implementation, the first device may not perform step A502, and may not send the first message to the smartwatch. In a possible implementation, the one or more device identifiers are set by a user.

In a possible implementation, the second device in step A502 is determined based on the device identifier of the third device. For example, in a possible implementation, the second device and the third device are corresponding to a same device. Optionally, after receiving the establishment information, the first device determines a device identifier of the second device (namely, the third device), and sends, based on the device identifier of the second device, the first message to the second device.

In embodiments of this application, the second device is not limited to being determined based on the device identifier of the third device. For example, in a possible implementation, the second device in step A502 is one or more devices specified in advance. Alternatively, in a possible implementation, the second device in step A502 is any one or more devices that establish a communication connection to the first device.

The first device includes step A503 in the trigger event of step A502, which helps the first device more accurately predict whether the user expects the second device to output the location information related to the first location information, thereby helping save device resources (such as computing resources and network resources) of the first device and the second device.

Optionally, the first device and the second device involved in steps A501 to A503 may be respectively the first device and the second device in the communication system that supports the tap-to-transfer service described above, and the first device may perform steps A501 to A503 according to the transfer protocol, to provide the tap-to-transfer service.

For example, A503 may be understood with reference to the condition a2 of the tap-to-initiate procedure. Specifically, in A503, the first device obtains the establishment information of the first communication connection, and may obtain first information of the second device.

For example, A501 may be understood with reference to the condition a1 of the tap-to-initiate procedure. Specifically, in A501, the first location information is information displayed in a process in which the first device runs the first application, which is equivalent to meeting the condition a1.

For example, A502 may be understood with reference to step S101 of the tap-to-initiate procedure. Specifically, the first message in A502 may include the first message in S101, and the first service information in the first message may be determined based on the first location information in A501. For example, the first location information indicates an address of a navigation end point. The second service capability information in the first service information may indicate the navigation end point, and the content information in the second service capability information may indicate the address.

Based on that the trigger event of step A502 includes step A501 and step A503. The following describes a sequence between step A501 and step A503.

First sequence: In a possible implementation, step A501 is performed before step A503. Alternatively, step A503 includes: The first device receives the establishment information of the first communication connection after performing step A501.

In a possible implementation, that step A501 is performed before step A503 means that a moment at which the first device starts to display the first location information is earlier than a moment at which the first device receives the establishment information of the first communication connection. To be specific, if the first device displays the first location information before receiving the establishment information, and after receiving the establishment information, the first device continues to display the first location information, it is also considered that step A501 is prior to step A503, and the first device may perform step A502.

Based on the first sequence, the first message sent in step A502 is determined based on content displayed on the first screen before A503. Specifically, the first location information related to the first message is location information displayed on the first screen before A503 is performed.

Based on the first sequence, in a possible implementation, if the first device displays the first location information before step A503, and when the first device receives the establishment information of the first communication connection or after the first device receives the establishment information of the first communication connection, the first device continues to display the first location information, in a possible implementation, the first device may perform step A502 to send a first message to the second device.

Based on the first sequence, if the first device displays the first location information before step A503, and when the first device performs step A503 or after the first device performs step A503, the first device does not display the first location information, for example, displays other location information or displays no location information used to determine a geographic location, in possible implementation, the first device may perform step A502 to send a first message to the second device. The other location information is used to determine another geographic location other than the first geographic location.

Based on the first sequence, if the first device does not display the first location information before step A503, and displays the first location information after step A503, in a possible implementation, the first device may not perform step A502, that is, may not send a first message to the second device.

After the user reads the first location information, before the first device receives the establishment information, or when the first device receives the establishment information, or after the first device receives the establishment information, even if the first device no longer displays the first location information, after the first device receives the establishment information, this still helps implement sending the first message to the second device. Because the user does not need to maintain continuous display of the first location information on the first screen, this helps simplify a user operation.

In a possible implementation, step A503 specifically includes: The first device receives establishment information of the second communication connection within preset duration after starting or ending displaying the first location information. In a possible implementation, if the first device does not receive the establishment information of the first communication connection within the preset duration after starting or ending displaying the first location information, the first device may skip performing step A502.

After the user reads the first location information, if the user expects the first device to send a first message to the second device, the user generally operates the first device in a short time, so that the first device receives the establishment information of the second communication connection. After the user reads the first location information, if the user does not operate the first device within a long time to enable the first device to send a first message to the second device, it usually indicates that the user does not expect the first device to send a first message to the second device. Interval duration between a moment at which the first device starts or ends displaying the first location information and a moment at which the first device receives the establishment information is limited, which helps more accurately predict an intention of the user to operate the first device, and helps perform step A503 when the user expects the first device to send a first message to the second device, and skip performing step A503 when the user does not expect the first device to send a first message to the second device.

In a possible implementation, after determining that the first location information is displayed, the first device may obtain the first information. For how to obtain the first information, refer to a related description in step A502 for understanding. Details are not described herein again. The following describes, based on the first sequence, an occasion for which the first device obtains the first information.

In a possible implementation, the first device may immediately obtain the first information after displaying the first location information. For example, optionally, the first device obtains the first information after performing step A501 and before performing step A503.

Alternatively, in a possible implementation, the first device may not immediately obtain the first information after displaying the first location information. For example, optionally, after performing step A501, the first device first performs step A503, and after receiving the establishment information, the first device obtains the first information before performing step A502.

The following describes several possible implementations of the method in an embodiment of this application based on the first sequence.

Figure 14A:
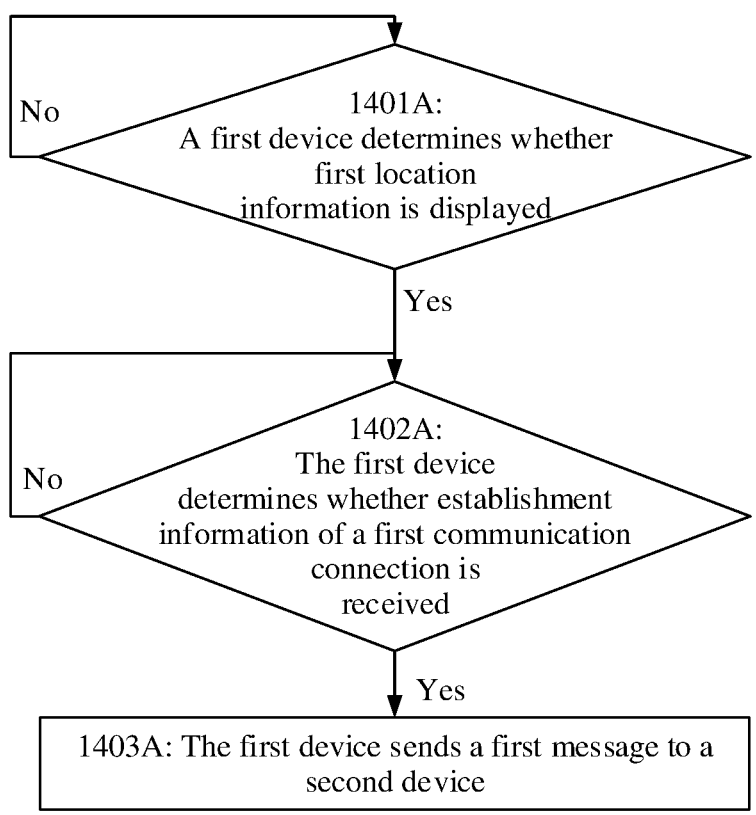
FIG. 14A shows steps of another possible embodiment of a geographic information processing method according to this application.

Refer to FIG. 14A. Based on the first sequence, another possible embodiment of the geographic information processing method in this application includes step 1401A to step 1403A.

1401A: A first device determines whether first location information is displayed, and performs step 1402A if the first location information is displayed, or performs step 1401A again if the first location information is not displayed.

For how the first device determines whether the first location information is displayed, refer to the foregoing related content. Details are not described herein again.

1402A: The first device determines whether establishment information of a first communication connection is received, and performs step 1403A if the establishment information is received, or performs step 1402A again if the establishment information is not received.

For a description of receiving, by the first device, the establishment information of the first communication connection, refer to related content of step A503. Details are not described herein again.

1403A: The first device sends a first message to a second device.

Step 1403A may be understood with reference to related content of step A502, and details are not described herein again.

In a possible implementation, after determining that the first location information is displayed, the first device may obtain first information. For how to obtain the first information, refer to the related description in step A502 for understanding. Details are not described herein again. In a possible implementation, the first device may immediately obtain the first information after determining that the first location information is displayed. For example, optionally, after determining that the first location information is displayed, the first device may first obtain the first information, and then perform step 1402A. Alternatively, in a possible implementation, after determining that the first location information is displayed, the first device may not immediately obtain the first information. For example, optionally, after determining that the first location information is displayed, the first device first performs step 1402A, and after determining that the establishment information is received, the first device obtains the first information before step 1403A.

In a possible implementation, after determining that the establishment information is received, the first device may determine, based on the establishment information, a device identifier of the second device in a first communication connection, and then perform step 1403A based on the device identifier. For a method for determining, by the first device based on the establishment information, the device identifier, refer to related content in step A503. Details are not described herein again.

Figure 14B:
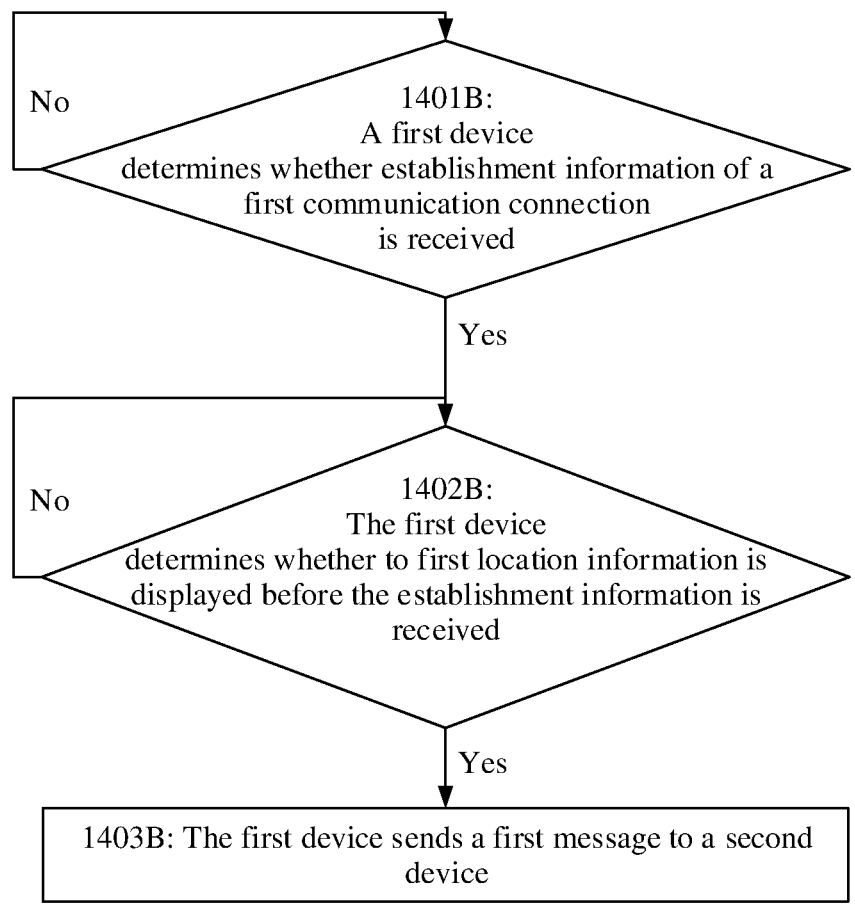
FIG. 14B shows steps of another possible embodiment of a geographic information processing method according to this application.

Refer to FIG. 14B. Still based on the first sequence, another possible embodiment of the geographic information processing method in this application includes step 1401B to step 1403B.

1401B: A first device determines whether establishment information of a first communication connection is received, and performs step 1402B if the establishment information is received, or performs step 1401B again if the establishment information is not received.

For a description of receiving, by the first device, the establishment information of the first communication connection, refer to related content of step A503. Details are not described herein again.

1402B: The first device determines whether first location information is displayed before the establishment information is received, and performs step 1403B if the first location information is displayed, or performs step 1402B again if the first location information is not displayed.

The first device may store information that has been displayed and a corresponding display time (a start time, an end time, or the like), to determine whether the first location information is displayed before the establishment information is received.

For a description of displaying the first location information by the first device, refer to related content in step A501. Details are not described herein again.

1403B: The first device sends a first message to a second device.

Step 1403B may be understood with reference to related content of step A502, and details are not described herein again.

In a possible implementation, after determining that the establishment information is received, the first device may determine, based on the establishment information, a device identifier of the second device in a first communication connection, and then perform step 1403B based on the device identifier. In an embodiment of this application, optionally, the first device may determine the device identifier before step 1402B, or optionally, the first device may determine the device identifier after step 1402B and before step 1403B. For a method for determining, based on the establishment information, the device identifier, refer to related content in step A503. Details are not described herein again.

Second sequence: In a possible implementation, step A503 is performed before step A501. Alternatively, step A501 includes: The first device displays the first location information after performing step A503.

In a possible implementation, that step A503 is performed before step A501 means that a moment at which the first device receives the establishment information of the second communication connection is earlier than a moment at which the first device starts to display the first location information.

Based on the second sequence, the first message sent in step A502 is determined based on content displayed on the first screen after A503 is performed. Specifically, the first location information related to the first message is location information displayed on the first screen after A503 is performed.

In a possible implementation, after performing step A503, the first device may determine, based on the establishment information, the device identifier of the second device in the first communication connection, and then perform step A502 based on the device identifier. In an embodiment of this application, optionally, the first device may determine the device identifier before step A501, or optionally, the first device may determine the device identifier after step A502 and before step A503. For a method for determining, based on the establishment information, the device identifier, refer to related content in step A503. Details are not described herein again.

After the user reads the first location information, in a process of delivering the establishment information, the first device needs to keep displaying the first location information, or if the first location information is no longer displayed, the first display interface needs to be called again after the establishment information is delivered. This is a complex operation and wastes excessive energy of the user.

Based on the second sequence, in a possible implementation, step A501 specifically includes: The first device displays the first location information within preset duration after the first device receives the establishment information of the second communication connection.

Third sequence: In a possible implementation, step A501 and step A503 are performed simultaneously.

In a possible implementation, that step A503 is performed before step A501 means that a moment at which the first device receives the establishment information of the second communication connection is earlier than a moment at which the first device starts to display the first location information.

After the user reads the first location information, the user needs to immediately deliver the establishment information, and operation difficulty is high.

Based on that the method in this embodiment of this application further includes step A503. In a possible implementation, the second communication connection is the same as the first communication connection. Optionally, after establishing the first communication connection to the second device, the first device may send the first message to the second device through the first communication connection.

Based on that the method in this embodiment of this application further includes step A503, alternatively in a possible implementation, the second communication connection is different from the first communication connection. Optionally, the second communication connection is established before the first device displays the first location information. For example, in a vehicle, a Bluetooth or Wi-Fi connection is always maintained between the first device and the second device. Alternatively, optionally, the second communication connection is established after the first device receives the establishment information of the first communication connection. For example, refer to FIG. 11C. After reading the first location information displayed on the screen 131 of the mobile phone 13, the user 11 puts the mobile phone 13 close to an NFC communication module (not shown in FIG. 11C) of the head unit 14. In this case, the mobile phone 13 can receive establishment information of a communication connection (that is, a first communication connection) in the NFC technology. Then, the user may place the mobile phone on a charging base. When charging the mobile phone, the charging base can further provide a communication connection (that is, a second communication connection) for the mobile phone and the head unit. Then, the mobile phone may send the first message to the head unit through the charging base (that is, through the second communication connection).

The foregoing describes that the trigger event of step A502 includes step A501 and step A503. In a possible implementation, the trigger event of step A502 includes only step A501 and step A503. Alternatively, in a possible implementation, in addition to step A501 and step A503, the trigger event of step A502 may further include another event.

For example, in a possible implementation, the another event may further include: The first device obtains disconnection information of the first communication connection. For example, optionally, the first device detects an operation that the user indicates the first device to disconnect the first communication connection, or optionally, the first device receives a notification that is sent by the second device and that is for disconnecting the first communication connection.

Based on that the trigger event of step A502 further includes that the first device obtains the disconnection information of the first communication connection. In a possible implementation, the second communication connection is different from the first communication connection. Optionally, the second communication connection is established before the first device displays the first location information. Alternatively, optionally, the second communication connection is established after the first device receives the establishment information of the first communication connection. For an explanation that the second communication connection is different from the first communication connection, refer to the foregoing corresponding content. Details are not described herein again.

In a possible implementation, the geographic information processing method in this application may include step B501 and step B502.

B501: The second device receives the first message.

The second device may receive the first message from the first device. In a possible implementation, the second device may receive the first message through the second communication connection. For the second communication connection and the first message, refer to a related description in step A502. Details are not described herein again.

Based on that the first message is obtained through encapsulation according to the first communication protocol, in a possible implementation, the second device may decapsulate the first message according to the first communication protocol. In a possible implementation, the second device may decapsulate the first message to obtain the first information carried in the first message. For understanding of the first communication protocol and the first information, refer to the foregoing related descriptions, for example, step A502. Details are not described herein again.

B502: The second device outputs the second location information based on the first message.

After receiving the first message, the second device may output, based on the first message, the second location information related to the first location information. The foregoing describes the location information related to the first location information. In a possible implementation, for understanding of the second location information, refer to the foregoing description of the location information related to the first location information. In a possible implementation, the second location information is any one type of location information in the location information related to the first location information.

For example, the first location information includes one piece of location information. It is assumed that the first location information is the text information 21 in FIG. 2. In a possible implementation, the second location information may be, for example, the water drop graph 42, the rectangle 43, or the curve segment 41 on the map shown in FIG. 4, or the text information 1201 shown in FIG. 12A, or the water drop graph 1205 or the rectangle 1206 on the map shown in FIG. 12B, or voice information "Gate N of Park A", or voice navigation information corresponding to the curve segment 41.

For example, the first location information includes at least two pieces of location information that describe different geographic locations. It is assumed that the first location information includes the link information 711 (describing a geographic location corresponding to the entrance of Supermarket Z) and the text information 712 (describing a geographic location corresponding to Gate N of Park A) in FIG. 7A. In a possible implementation, the second location information may be related to only one piece of location information in the at least two pieces of location information. It is assumed that the second location information is related only to the link information 711 or the text information 712. For example, the second location information is the text information 1201 shown in FIG. 12A, or the water drop graph 1205 or the rectangle 1206 on the map shown in FIG. 12B, or, for example, the voice information "Gate N of Park A", or the voice navigation information corresponding to the curve segment 41. Alternatively, in a possible implementation, the second location information may be related to a plurality of pieces of location information in the at least two pieces of location information. It is assumed that the second location information is related to both the link information 711 and the text information 712, and the second location information includes, for example, the text information 1301 and the text information 1302 shown in FIG. 13A, so that the user selects a passing location for navigation or specifies a passing sequence of a plurality of locations from the plurality of geographic locations (the entrance of Supermarket Z and N Gate of Park A) described by the plurality of pieces of location information. Alternatively, the second location information includes, for example, the curve segment 1306, the water drop graph 1303, the water drop graph 1304, the rectangle 1307, and a rectangle 1308 shown in FIG. 13B, and is used to output navigation information based on automatically selected passing locations (the entrance of Supermarket Z and Gate N of Park A) and a passing sequence (the entrance of Supermarket Z first, and then Gate N of Park A). Optionally, the selected passing location may be used as a start location, a passing location, or an end location of navigation.

Through step B501 and step B502, the second device can output the second location information related to the first location information without a need for the user to operate the second device, which helps simplify a user operation.

In embodiments of this application, an interface type of a display interface on which the second location information is located and an interface type of a display interface on which the first location information is located are not limited to be the same, for example, both may be any one of the foregoing four interface types, or may be any two different interface types of the foregoing four interface types.

Based on the first information carried in the first message, in a possible implementation, the second device may output the second location information based on the first information. For understanding of the first information, refer to the foregoing related descriptions. Details are not described herein again.

Based on that the first message further carries the first identifier described above, in a possible implementation, the second device may determine an APP corresponding to the first identifier. Then, in a possible implementation, the second device may automatically or after consulting the user, open the APP corresponding to the first identifier, parse the first information by using the APP, and output a second location information based on a parsing result.

In a possible implementation, the second location information is navigation information that describes the first path. In a possible implementation, before step B502, the second device outputs navigation information that describes the second path. To be specific, before step 502, the second device is performing navigation. In a possible implementation, the second device outputs the second location information based on the second path and the first message. For example, in a possible implementation, a start location of the first path is a current location of the second path. In a possible implementation, a passing location of the second path is determined based on the passing location of the first path, and the end location of the second path is determined based on the first message. Alternatively, in a possible implementation, an end location of the second path is the same as that of the first path, and a passing location of the second path is determined based on the first message. Alternatively, in a possible implementation, both a passing location and an end location of the second path are determined based on the first message.

In a possible implementation, after the first device performs steps A501 and A502, the second device may perform steps B501 and B502. However, it should be noted that, in the geographic information processing method in embodiments of this application, it is not limited that after the first device performs step A502, the second device definitely performs step B501 and step B502. In the geographic information processing method in embodiments of this application, it is not limited that before the second device performs step B501, the first device definitely performs step A501 and step A502.

Optionally, the first device and the second device involved in steps B501 and B502 may be respectively the first device and the second device in the communication system that supports the tap-to-transfer service described above, and the second device may perform steps B501 and B502 according to the transfer protocol.

For example, B501 may be understood with reference to the condition b1 of the tap-to-execute procedure. Specifically, the first message received by the first device in B501 may include the first message mentioned in the condition b1.

For example, B502 may be understood with reference to step S102 of the tap-to-execute procedure. Specifically, in B502, that the second device outputs the second location information based on the first message may be a possible manner in which the second device runs the second application based on the first message to provide the first service.

The foregoing describes the method in embodiments of this application, and the following describes an apparatus provided in embodiments of this application.

Figure 15:
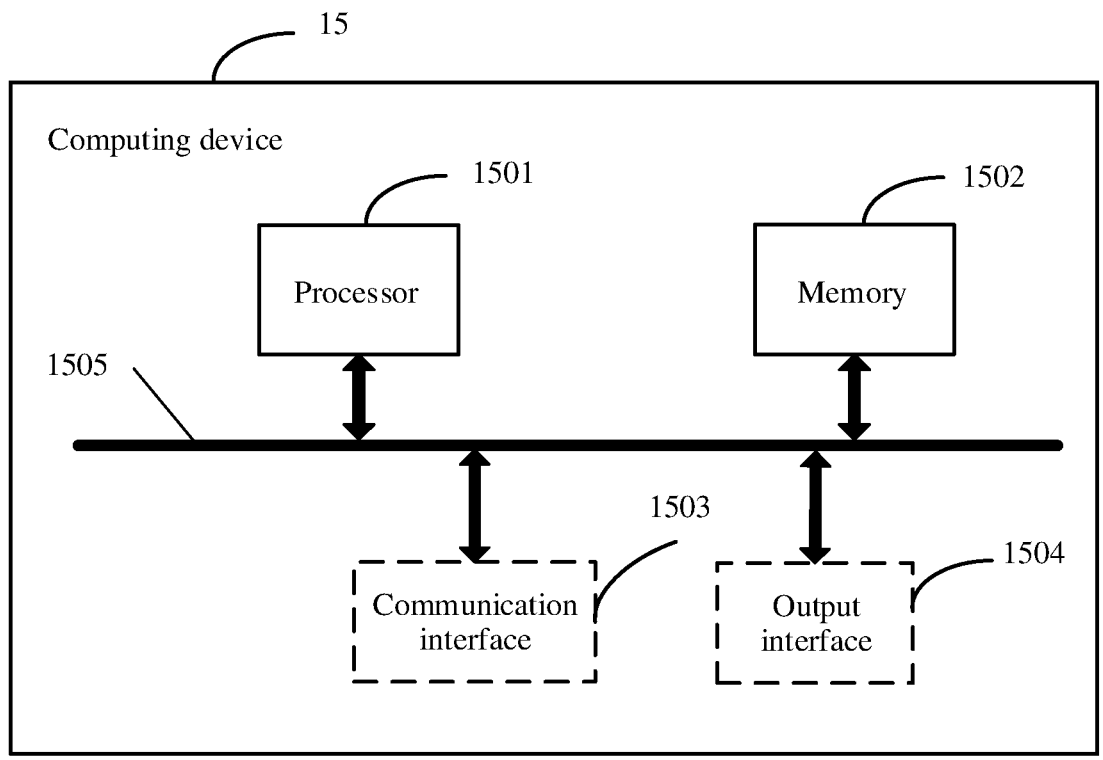
FIG. 15 shows a possible structure of a computing device according to an embodiment of this application.

An embodiment of this application provides a computing device. FIG. 15 is a schematic diagram of a possible structure of a computing device 15 according to an embodiment of this application. Refer to FIG. 15. The computing device 15 includes a processor 1501 and a memory 1502.

The processor 1501 may be one or more CPUs, and the CPU may be a single-core CPU, or may be a multi-core CPU.

The memory 1502 includes but is not limited to a random access memory (random access memory, RAM), a read-only memory (Read-only Memory, ROM), an erasable programmable read-only memory (erasable programmable read-only memory, EPROM), a flash memory, an optical memory, or the like. The memory 1502 stores program code, or computer-readable program code, or code of an operating system and program code, or computer program code, or a function program. Optionally, the memory 1502 may be a non-volatile memory or a volatile memory.

In a possible implementation, the computing device 15 further includes a communication interface 1503. The communication interface 1503 may be a wired interface, for example, a fiber distributed data interface (Fiber Distributed Data Interface, FDDI) or a gigabit Ethernet (Gigabit Ethernet, GE) interface. The communication interface 1503 may alternatively be a wireless interface. The communication interface 1503 is configured to receive network data from an internal network and/or an external network.

In a possible implementation, the computing device 15 further includes an output device connected to the output interface 1504. The output interface 1504 is connected to the output device, and is configured to output a voice, an image, or the like to a user through the output device. The output device includes but is not limited to a monitor, a printer, a speaker, or the like.

Optionally, the geographic information processing apparatus further includes a bus 1505. The processor 1501, the memory 1502, the communication interface 1503, and the output interface 1504 are usually connected to each other through the bus 1505, or may be connected to each other in another manner.

The processor 1501 reads and executes the program code stored in the memory 1502, so that the computing device 15 performs the method performed by the first device in the foregoing method embodiments. For example, the processor 1501 reads and executes the program code stored in the memory 1502, so that the computing device 15 performs steps A501, A502, and A503 in the embodiment shown in FIG. 5, or steps 1401A to 1403A in the embodiment shown in FIG. 14A, or steps 1401B to 1403B in the embodiment shown in FIG. 14B. The processor 1501 reads and executes the stored program code, so that the computing device 15 performs the foregoing steps. For more details, refer to corresponding descriptions in the foregoing method embodiments. Details are not described herein again.

Optionally, the program code is stored in a memory outside the computing device. When the program code is decoded and executed by the processor 1501 of the computing device 15, the memory 1502 in the computing device 15 temporarily stores some or all of the program code. Optionally, some content of the program code is stored in a memory outside the computing device 15, and other content of the program code is stored in the memory 1502 inside the computing device 15.

In a possible implementation, the computing device 15 may be a terminal. Optionally, the computing device may be a handheld terminal (like a mobile phone, a notebook computer, a tablet computer, a smartwatch, or smart glasses), an in-vehicle terminal (like a head unit or an in-vehicle PC), or the like.

Figure 16:
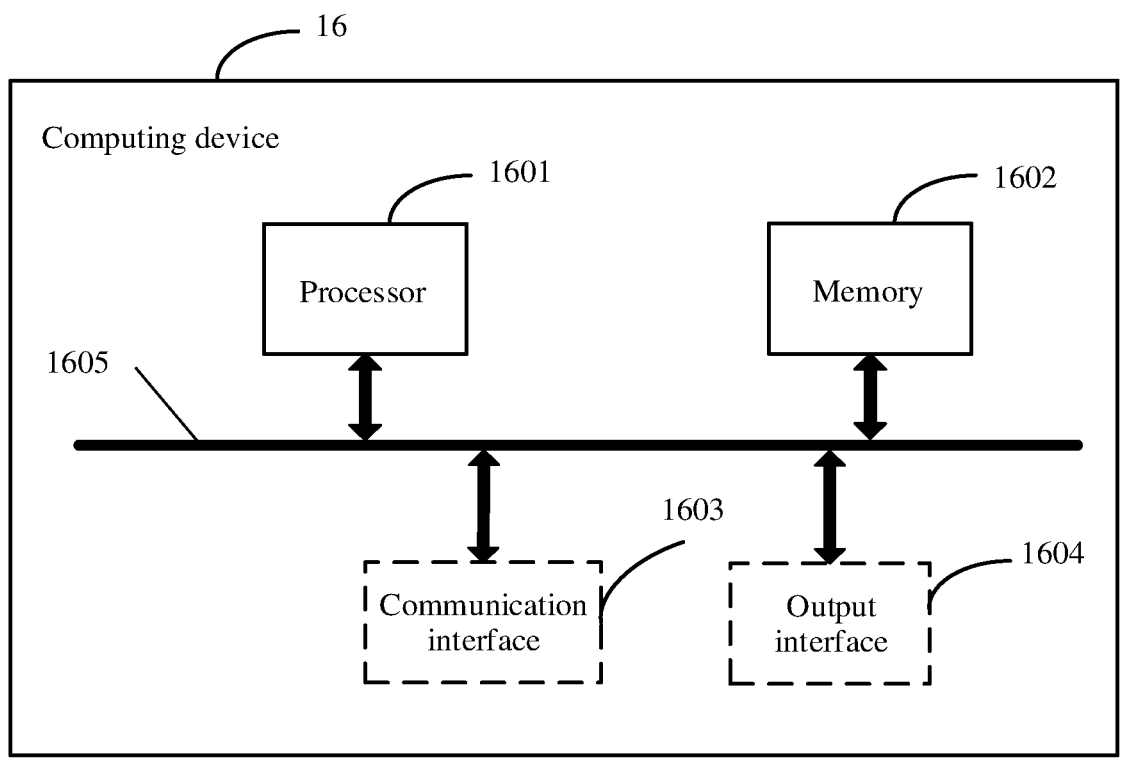
FIG. 16 shows another possible structure of a computing device according to an embodiment of this application.

An embodiment of this application provides a computing device. FIG. 16 is a schematic diagram of a possible structure of a computing device 16 according to an embodiment of this application. Refer to FIG. 16. The computing device 16 includes a processor 1601 and a memory 1602.

In a possible implementation, the computing device 16 may further include a communication interface 1603. In a possible implementation, the computing device 16 may further include an output interface 1604. In a possible implementation, the computing device 16 may further include a bus 1605.

For descriptions of the processor 1601, the memory 1602, the communication interface 1603, the output interface 1604, and the bus 1605, refer to related content in the embodiment corresponding to FIG. 15 for understanding. Details are not described herein again.

The processor 1601 reads and executes program code stored in the memory 1602, so that the computing device 16 performs the method performed by the second device in the foregoing method embodiments. For example, the processor 1601 reads and executes the program code stored in the memory 1602, so that the computing device 16 performs step B501 or step B502 in the embodiment shown in FIG. 5.

The processor 1601 reads and executes the stored program code, so that the computing device 16 performs the foregoing steps. For more details, refer to corresponding descriptions in the foregoing method embodiments. Details are not described herein again.

Optionally, the program code is stored in a memory outside the computing device. When the program code is decoded and executed by the processor 1601 of the computing device 16, the memory 1602 in the computing device 16 temporarily stores some or all of the program code. Optionally, some content of the program code is stored in a memory outside the computing device 16, and other content of the program code is stored in the memory 1602 inside the computing device 16.

In a possible implementation, the computing device 16 may be a terminal. Optionally, the computing device may be a handheld terminal (like a mobile phone, a notebook computer, a tablet computer, a smartwatch, or smart glasses), an in-vehicle terminal (like a head unit or an in-vehicle PC), or the like.

An embodiment of this application further provides a chip system, including a processor and an interface circuit. The processor is configured to be coupled to a memory through the interface circuit. The processor is configured to run program code (or computer-readable program code or computer program code or a function program or program code), to implement the method provided in any one of the foregoing method embodiments of this application.

In an example, the processor may execute program code stored in the memory, so that the chip system performs any one of the foregoing method embodiments. The memory may be a storage unit in the chip system, for example, a register or a cache, or the memory may be a memory that is in a computing device and that is located outside the chip system, for example, a read-only memory (read-only memory, ROM), another type of static storage device that can store static information and program code, or a random access memory (random access memory, RAM). Optionally, the memory may be a non-volatile memory or a volatile memory. Optionally, the processor may be a general-purpose central processing unit (CPU), a microprocessor, an application-specific integrated circuit (application-specific integrated circuit, ASIC), or one or more integrated circuits configured to control program execution of any one of the foregoing method embodiments.

An embodiment of this application provides a geographic information processing apparatus. The geographic information processing apparatus may be the first device mentioned in the method in embodiments of this application, or an apparatus (for example, a chip system) in the first device, or an apparatus that can be used together with the first device.

Figure 17:
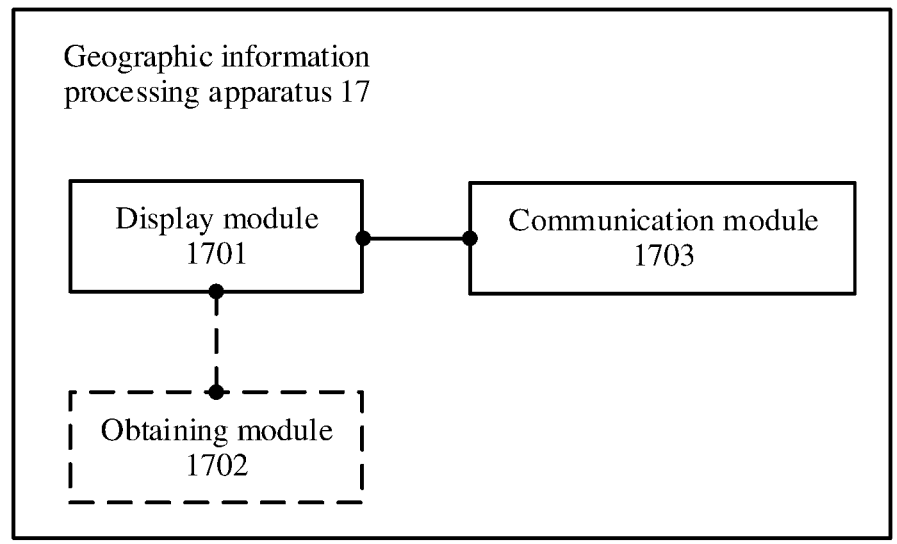
FIG. 17 shows a possible structure of a geographic information processing apparatus according to an embodiment of this application.

FIG. 17 is a schematic diagram of a possible structure of a geographic information processing apparatus 17 according to an embodiment of this application. Refer to FIG. 17. The geographic information processing apparatus 17 includes a display module 1701 and a communication module 1703.

In a possible implementation, the geographic information processing apparatus 17 further includes an obtaining module 1702.

The display module 1701 is configured to perform step A501 in the embodiment shown in FIG. 5, the obtaining module 1702 is configured to perform step A503 in the embodiment shown in FIG. 5, and the communication module 1703 is configured to perform step A502 in the embodiment shown in FIG. 5.

Alternatively, the display module 1701 is configured to perform step 1401A in the embodiment shown in FIG. 14A or step 1402B in the embodiment shown in FIG. 14B.

Alternatively, the obtaining module 1702 is configured to perform step 1402A in the embodiment shown in FIG. 14A or step 1401B in the embodiment shown in FIG. 14B.

Alternatively, the communication module 1703 is configured to perform step 1403A in the embodiment shown in FIG. 14A or step 1403B in the embodiment shown in FIG. 14B.

Module division of the geographic information processing apparatus 17 described in FIG. 17 is merely an example, and is merely logical function division and may be classified during actual implementation. For example, a plurality of modules or components may be combined or integrated into another system, or some features may be ignored or may not be performed. Function modules in the geographic information processing apparatus may be integrated into one processing module, or each of the modules may stand alone physically, or two or more modules are integrated into one module.

The modules in FIG. 17 may be implemented in a form of hardware, or may be implemented in a form of a software functional unit. For example, when software is used for implementation, the modules in FIG. 17 may be implemented by software functional modules generated after the processor 1501 in FIG. 15 reads the program code stored in the memory 1502. The modules in FIG. 17 may also be separately implemented by different hardware in FIG. 15. For example, the display module 1701 may be implemented by the output interface 1504, the communication module 1703 is implemented by the communication interface 1503, and the obtaining module 1702 is implemented by some processing resources in the processor 1501 in FIG. 15 (for example, another core in a multi-core processor), or by using a programmable device like a field-programmable gate array (field-programmable gate array, FPGA) or a coprocessor. It is clearly that the foregoing function modules may alternatively be implemented by using a combination of software and hardware. For example, the display module 1701 may be implemented by the output interface 1504, the communication module 1703 is implemented by the communication interface 1503, and the obtaining module 1702 is a software function module generated after the processor 1501 reads the program code stored in the memory 1502.

An embodiment of this application further provides a geographic information processing apparatus. The geographic information processing apparatus may be the second device mentioned in the method in embodiments of this application, or an apparatus (for example, a chip system) in the second device, or an apparatus that can be used together with the second device.

Figure 18:
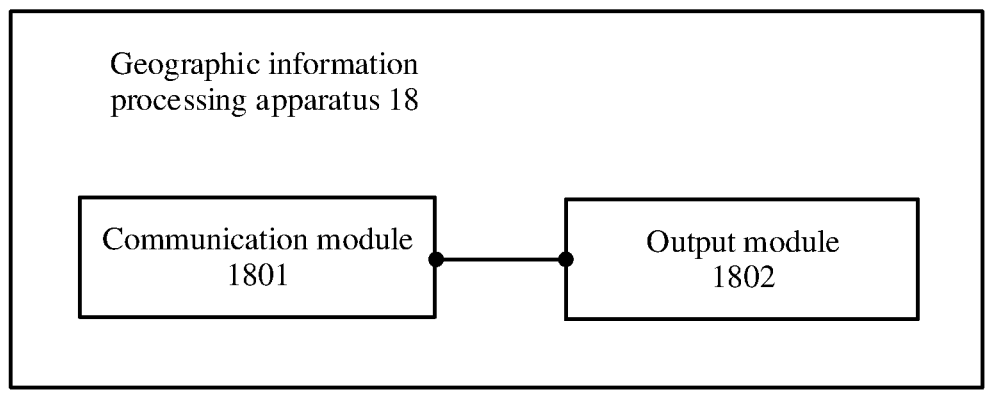
FIG. 18 shows another possible structure of a geographic information processing apparatus according to an embodiment of this application.

FIG. 18 is a schematic diagram of a possible structure of a geographic information processing apparatus 18 according to an embodiment of this application. Refer to FIG. 18. The geographic information processing apparatus 18 includes a communication module 1801 and an output module 1802.

The communication module 1801 is configured to perform step B501 in the embodiment shown in FIG. 5, and the output module 1802 is configured to perform step B502 in the embodiment shown in FIG. 5.

Module division of the geographic information processing apparatus 18 described in FIG. 18 is merely an example, and is merely logical function division and may be classified during actual implementation. For example, a plurality of modules or components may be combined or integrated into another system, or some features may be ignored or may not be performed. Function modules in the geographic information processing apparatus may be integrated into one processing module, or each of the modules may stand alone physically, or two or more modules are integrated into one module.

The modules in FIG. 18 may be implemented in a form of hardware, or may be implemented in a form of a software functional unit. For example, when software is used for implementation, the modules in FIG. 18 may be implemented by software functional modules generated after the processor 1601 in FIG. 16 reads the program code stored in the memory 1602. The modules in FIG. 18 may alternatively be separately implemented by different hardware in FIG. 16. For example, the output module 1802 may be implemented by the output interface 1604, and the communication module 1801 may be implemented by the communication interface 1603. It is clearly that the foregoing function modules may alternatively be implemented by using a combination of software and hardware. For example, the output module 1802 may be implemented by the output interface 1604, and the communication module 1801 is a software function module generated after the processor 1601 reads the program code stored in the memory 1602.

Figure 19:
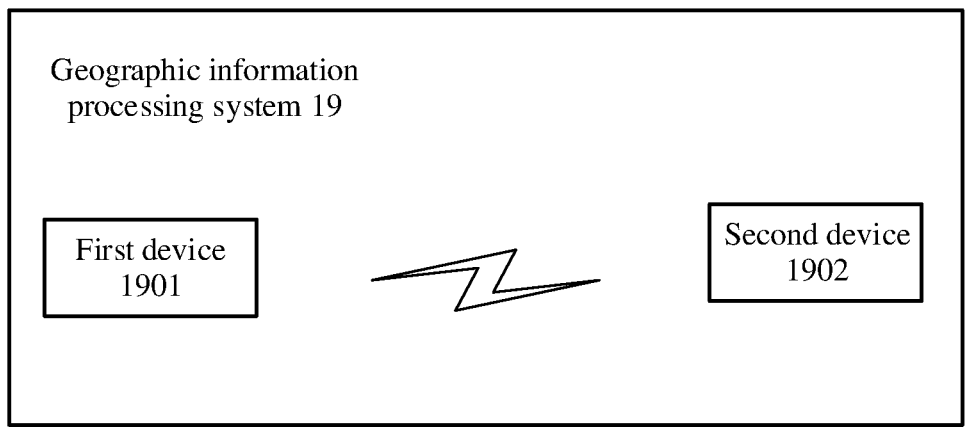
FIG. 19 shows a possible structure of a geographic information processing system according to an embodiment of this application.

Refer to FIG. 19. An embodiment of this application further provides a geographic information processing system 19. The geographic information processing system 19 may include a first device 1901 and a second device 1902. In a possible implementation, a communication connection may be established between the first device 1901 and the second device 1902. In a possible implementation, the first device 1901 and the second device 1902 are respectively the computing device corresponding to FIG. 15 and the computing device corresponding to FIG. 16. In a possible implementation, the first device 1901 and the second device 1902 are respectively the geographic information processing apparatus corresponding to FIG. 17 and the geographic information processing apparatus corresponding to FIG. 18.

The coupling in embodiments of this application may be an indirect coupling or a communication connection between apparatuses, units, or modules in an electrical form, a mechanical form, or another form, and is used for information exchange between the apparatuses, the units, or the modules.

A person of ordinary skill in the art may understand that when software is used to implement the aspects or possible implementations of the aspects in embodiments of this application, all or a part of the aspects or the possible implementations of the aspects may be implemented in a form of a computer program product. The computer program product refers to program code (or computer-readable program code or computer program code or a function program or program code) stored in a computer-readable medium. When the program code is loaded and executed on a computer, all or some of the procedures or functions described in embodiments of this application are generated.

The computer-readable medium may be a computer-readable signal medium or a computer-readable storage medium. The computer-readable storage medium includes but is not limited to an electronic, magnetic, optical, electromagnetic, infrared, or semiconductor system, device, or apparatus, or any proper combination thereof. For example, the computer-readable storage medium is a random access memory (random access memory, RAM), a read-only memory (read only memory, ROM), an erasable programmable read-only memory (erasable programmable read only memory, EPROM), or a portable read-only memory (compact disc read-only memory, CD-ROM).

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device. "A plurality of" mentioned in embodiments of this application means two or more.

It is clear that a person skilled in the art may make various modifications and variations to the present invention without departing from the scope of the present invention. The present invention is intended to cover these modifications and variations provided that they fall within the scope of protection defined by the following claims.

What is claimed is:

1. A service providing method, comprising:
sending, by a first device, a first message to a second device, wherein the first message comprises first service information indicating to provide a first service by the first device by running a first application; and
running, by the second device, a second application based on the first message, to provide the first service;
wherein after the running, by the second device, the second application based on the first message, the method further comprises:
sending, by the second device, a second message to the first device, wherein the second message comprises second service information indicating to provide a second service by the second device by running the second application; and
running, by the first device, the first application based on the second message, to provide the second service.

2. The method according to claim 1, further comprising:
before sending the first message to the second device, obtaining, by the first device, first information from the second device, wherein the first information indicates that the second device has a capability of providing the first service.

3. The method according to claim 2, wherein the first information comprises first service capability information indicating one or more service capabilities supported by the second application, and wherein the one or more service capabilities comprise a first service capability supported by the first application.

4. The method according to claim 3, wherein the first service information comprises second service capability information and service content information, the second service capability information indicates the first service capability, and the service content information is obtained from the first application based on the first service capability.

5. The method according to claim 1, wherein the running, by the second device, a second application based on the first message comprises:
inputting, by the second device, the service content information into an interface corresponding to the second service capability information.

6. The method according to claim 1, wherein the first information comprises service type information, the service type information indicates one or more service types supported by the second application, and the one or more service types comprise a type of the first service.

7. The method according to claim 1, wherein the first information comprises application identifier information, the application identifier information indicates an identifier of the second application, and the identifier of the second application is same as an identifier of the first application.

8. The method according to claim 7, wherein the first application and the second application are different versions on different devices.

9. The method according to claim 1, wherein the first application and the second application are navigation applications, and the first service is used to output navigation information corresponding to a first path to a user; or
the first application and the second application are music applications, and the first service is used to output first audio to a user; or
the first application and the second application are video applications, and the first service is used to output a first video to a user; or
the first application and the second application are picture applications, and the first service is used to output a first image to a user; or
the first application and the second application are reading applications, and the first service is used to output a first document to a user.

10. A service providing method, comprising:
receiving, by a second device, a first message, wherein the first message is sent by a first device to the second device, the first message comprises first service information indicating to provide a first service by the first device by running a first application; and
running, by the second device, a second application based on the first message, to provide the first service;
wherein after the running, by the second device, the second application based on the first message, the method further comprises:
sending, by the second device, a second message to the first device, wherein the second message comprises second service information indicating to provide a second service by the second device by running the second application; and
running, by the first device, the first application based on the second message, to provide the second service.

11. The method according to claim 10, further comprising:
before sending the first message by the first device, obtaining, by the first device, first information from the second device, wherein the first information indicates that the second device has a capability of providing the first service.

12. The method according to claim 11, wherein the first information comprises first service capability information indicating one or more service capabilities supported by the second application, and wherein the one or more service capabilities comprise a first service capability supported by the first application.

13. The method according to claim 12, wherein the first service information comprises second service capability information and service content information, the second service capability information indicates the first service capability, and the service content information is obtained from the first application based on the first service capability.

14. The method according to claim 10, wherein the running, by the second device, a second application based on the first message comprises:
inputting, by the second device, the service content information into an interface corresponding to the second service capability information.

15. The method according to claim 10, wherein the first information comprises service type information, the service type information indicates one or more service types supported by the second application, and the one or more service types comprise a type of the first service.

16. The method according to claim 10, wherein the first information comprises application identifier information, the application identifier information indicates an identifier of the second application, and the identifier of the second application is same as an identifier of the first application.

17. An apparatus, comprising:
at least one processor, configured to:
send a first message to a second device, wherein the first message comprises first service information indicating to provide a first service by a first device by running a first application; and
run, by the second device, a second application based on the first message, to provide the first service;
wherein after the running, by the second device, the second application based on the first message, the at least one processor being further configured to:
send, by the second device, a second message to the first device, wherein the second message comprises second service information indicating to provide a second service by the second device by running the second application; and
run, by the first device, the first application based on the second message, to provide the second service.

18. An apparatus, comprising:
at least one processor, configured to:
receive a first message, wherein the first message is sent by a first device to a second device, the first message comprises first service information indicating to provide a first service by the first device by running a first application; and
run a second application based on the first message, to provide the first service;
wherein after the running, by the second device, the second application based on the first message, the at least one processor being further configured to:
send, by the second device, a second message to the first device, wherein the second message comprises second service information indicating to provide a second service by the second device by running the second application; and
run, by the first device, the first application based on the second message, to provide the second service.

* * * * *